United States Patent
Lin

(10) Patent No.: US 12,133,094 B2
(45) Date of Patent: Oct. 29, 2024

(54) METHOD USED BY UE TO PRECONFIGURE RESOURCE FOR SMALL DATA TRANSMISSION IN INACTIVE STATE AND UE USING THE SAME

(71) Applicant: Acer Incorporated, New Taipei (TW)

(72) Inventor: Jung-Mao Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 105 days.

(21) Appl. No.: 17/468,656

(22) Filed: Sep. 7, 2021

(65) Prior Publication Data

US 2022/0124520 A1    Apr. 21, 2022

Related U.S. Application Data

(60) Provisional application No. 63/092,506, filed on Oct. 15, 2020.

(51) Int. Cl.
*H04W 24/02* (2009.01)
*H04L 1/08* (2006.01)
(Continued)

(52) U.S. Cl.
CPC .............. *H04W 24/02* (2013.01); *H04L 1/08* (2013.01); *H04W 72/23* (2023.01); *H04W 74/0833* (2013.01)

(58) Field of Classification Search
CPC . H04W 24/02; H04W 72/23; H04W 74/0833; H04W 76/27; H04W 28/26;
(Continued)

(56) References Cited

U.S. PATENT DOCUMENTS

2012/0254890 A1* 10/2012 Li ........................... H04W 4/70
  719/313
2017/0367110 A1   12/2017 Li et al.
(Continued)

FOREIGN PATENT DOCUMENTS

CN      108616922      10/2018
CN      111246590       6/2020
(Continued)

OTHER PUBLICATIONS

Nokia et al.,"Small Data Transmission over pre-configured PUSCH resources", 3GPP TSG-RAN WG2 Meeting #111e, Aug. 17-28, 2020, pp. 1-5.
(Continued)

*Primary Examiner* — Mang Hang Yeung
(74) *Attorney, Agent, or Firm* — JCIPRNET

(57) ABSTRACT

The disclosure is directed to a method used by a UE to preconfigure a resource for small data transmission in an inactive state and a user equipment using the same method. In one of the exemplary embodiments, the disclosure is directed to a method used by a UE to preconfigure a resource for small data transmission in an inactive state. The method would include not limited to: receiving a CG configuration which is for a small data transmission before entering an inactive state; verifying a CG resource of a camping cell associated with the CG configuration by determining whether the camping cell satisfies a validation condition before triggering a SDT procedure, wherein the CG configuration comprises a list of CG configurations associated with a list of cells; and utilizing the CG resource for the SDT procedure when the validation condition has been determined as being satisfied.

22 Claims, 29 Drawing Sheets

(51) Int. Cl.
*H04W 72/23* (2023.01)
*H04W 74/0833* (2024.01)

(58) Field of Classification Search
CPC . H04W 72/02; H04W 28/04; H04W 72/1268; H04W 72/535; H04L 1/08
USPC .......................................................... 370/254
See application file for complete search history.

(56) References Cited

U.S. PATENT DOCUMENTS

| | | |
|---|---|---|
| 2018/0220485 A1* | 8/2018 | Su .......................... H04W 76/27 |
| 2019/0174571 A1* | 6/2019 | Deenoo ................. H04W 36/30 |
| 2020/0100321 A1 | 3/2020 | Sengupta et al. |
| 2020/0196349 A1* | 6/2020 | He ..................... H04W 72/1268 |
| 2023/0189213 A1* | 6/2023 | Kim ...................... H04W 72/04 |
| | | 455/458 |

FOREIGN PATENT DOCUMENTS

| | | |
|---|---|---|
| TW | 202123738 | 6/2021 |
| WO | 2020191059 | 9/2020 |

OTHER PUBLICATIONS

"Search Report of Europe Counterpart Application", issued on Mar. 16, 2022, p. 1-p. 9.
Email Discussion Rapporteur (ZTE Corporation), "Agreeable details of RRC-based solution for SDT (RACH and CG)", 3GPP TSG-RAN2 Meeting #112-e, Oct. 14, 2020, pp. 1-54.

* cited by examiner

801 —

| Reserved objective | Resource status |
|---|---|
| Cell B | Valid |
| Cell A | Valid |

802 —

| CG-SDT configuration ID | Resource status |
|---|---|
| CG config. 1 | Valid |
| CG config. 1 | Valid |

803 —

| Reserved objective | CG-SDT configuration ID | Resource status |
|---|---|---|
| Cell B | CG-SDT config. 1 | Valid |
|  | CG-SDT config. 3 | Valid |
| Cell A | CG-SDT config. 2 | Valid |

FIG. 8

| Reserved objective | Resource status |
|---|---|
| Cell B | Valid |
| ~~Cell A~~ | ~~Valid~~ |

S901

| CG-SDT resource ID | Resource status |
|---|---|
| CG-SDT config. 1 | Valid |
| CG-SDT config. 3 | Invalid |

| Reserved objective | Version information |
|---|---|
| Cell B | Version 1 |
| Cell A | Version 2 |

2001

| CG-SDT configuration ID | Version information |
|---|---|
| CG-SDT config. 1 | Version 1 |
| CG-SDT config. 2 | Version 2 |

2002

| Reserved objective | CG-SDT configuration ID | Version information |
|---|---|---|
| Cell B | CG-SDT config. 1 | Version 2 |
| | CG-SDT config. 3 | Version 1 |
| Cell A | CG-SDT config. 2 | Version 3 |

METHOD USED BY UE TO PRECONFIGURE RESOURCE FOR SMALL DATA TRANSMISSION IN INACTIVE STATE AND UE USING THE SAME

CROSS REFERENCE TO RELATED APPLICATION

This application claims the priority benefit of U.S. provisional application Ser. No. 63/092,506, filed on Oct. 15, 2020. The entirety of the above-mentioned patent application is hereby incorporated by reference herein and made a part of specification.

TECHNICAL FIELD

The disclosure is directed to a method used by a UE to preconfigure a resource for small data transmission in an inactive state and a user equipment using the same method.

BACKGROUND

Currently, for a Fifth Generation (5G) communication system or New Ratio (NR) and beyond, there is an increasing need to transmit small data while a device operates in an inactive state. Small data is conventionally referred to a data that is in the order of a few kilobytes or tens of kilobytes. Small data traffic is commonly referred to as small and infrequent data traffic and does commonly occur for smart phone related applications such as instant messaging (IM) services, heart beat or keep alive traffic from IMs or email clients, push notifications from various applications, and etc. Small data traffic may also occur for non-smart phone related applications such as data traffic and positioning information from wearables, periodic or aperiodic sensor readings from the industrial applications, smart meter reading, and etc.

One objective of the small data transmissions (SDT) is to transmit the uplink (UL) data on preconfigured UL resources by reusing the configured grant (CG) type 1 scheme when the timing alignment (TA) information is still valid. CG type 1 in new Radio (NR) could be used by a UE operating in a connected mode to transmit UL data without requesting for a UL resource. A UE's CG type 1 resource configuration could be released by a dedicated RRC message such as a RRC reconfiguration message. In a previous Long-Term Evolution (LTE) communication system, a UE operating under an idle mode may also transmit UL data without requesting for a UL resource. In such case, the UE may transmit UL data by using a pre-configured UL resource (PUR). However, in LTE communication system, the use of PUR is only applicable to specific UEs such as move-less nodeB (NB) Internet-of-Things (IoT) UEs, and the UEs' PUR resource configuration may be released when the PUR resource is no longer valid.

The PUR resource configuration could be valid under certain conditions such as a UE maintaining a valid timing alignment (TA) information. The PUR resource configuration would be valid at the cell where the release message is received, but once a cell re-selection has occurred as a UE reselects to another cell, the PUR configuration would become invalid. The main for the PUR configuration only being valid on the last serving cell is that after camping on another cell, the UL TA will likely become unknown. Thus, according to the above described PUR valid conditions, the PUR scheme in LTE would only be applicable for the move-less or stable idle mode UEs.

Currently, for a 5G or NR communication system, a reserved resource (e.g. pre-CG configuration) of a cell for an inactive UE has been introduced. Under such scheme, only the CG-SDT configuration of the last serving cell would be considered as valid. This means that the CG-SDT configuration would become invalid when a UE in an inactive state camps on or reselects another cell. Hence, the inactive state UE would need to establish a connection for small UL data transmissions even if the UE in an inactive state has configured CG for SDT. Considering that NR cells typically have smaller coverage areas than LTE cells, the cell reselection may occur more easily for a moving UE that operates under an inactive state. Therefore, the efficacy of the CG-SDT scheme would be reduced for such moving UE that operates under an inactive state. However, for the NR, a UE reselecting or camping on another cell may not always cause the UE's UL TA to be unknown.

FIG. 1~FIG. 3 shows three scenarios under which the TA is still predictable even though a UE that operates under an inactive state camps on a NR cell other than a last serving cell. For the scenario of FIG. 1, a Radio Access Network (RAN) based tracking area (RNA) contains multiple cells that operate under millimeter waves (mmWave) where the cell sizes are small relative to LTE cells. Within the RNA, as shown in FIG. 1, the cells that have small cell sizes may have UL TAs that are zero or close to zero. This means that for NR cells that are small within the RNA, the UL TA information could be predictable when UEs camp on this kind of cell. For the scenario of FIG. 2 in which a high-speed train very quickly goes through a High-Speed Dedicated Network (HSDN) which are small cells that are deployed to provide network access to users on a high-speed train, the UL TA for these smalls may also be zero or close to zero. For the scenario of FIG. 3 in which cell 1, cell 2, and cell 3 are co-located, then for UE 1, the UL TA of UE 1 associated with cells 1, 2, and 3 would be the same. Therefore, regardless of whether the UE 1 camps on cell 1, cell 2, or cell 3, the UL TA would still be known.

Therefore, if CG-SDT configuration could be configured for cells in the scenarios of FIG. 1~FIG. 3 or similar scenarios, the efficacy of CG-SDT scheme could be increased. However, if such is to be accomplished, the CG-SDT scheme has to be valid not only at one cell but has to extend to other cells. Hence, when a UE that operates in an inactive state moves from one cell to another cell, the UE may still experience the benefits of an improved CG-SDT scheme. For example, an improved CG-SDT scheme could deployed in the HSDN scenario to reduce the signaling overload caused by the constant connection setup and release when a UE traverses rapidly from cell to cell. For example, the network could distribute inactive state UE to perform SDT by configuring multiple CG-SDT configurations associated with multiple cells that are co-located in order to achieve loading balance. However, currently there is no known mechanism to configure the CG-SDT scheme to multiple cells. Therefore, an enhanced CG-SDT scheme used to configure multiple CG-SDT configurations with multiple cells would be needed in order to achieve the benefits described above.

SUMMARY OF THE DISCLOSURE

Accordingly, the disclosure is directed to a method used by a UE to preconfigure a resource for small data transmission in an inactive state and a user equipment using the same method.

In one of the exemplary embodiments, the disclosure is directed to a method used by a UE to preconfigure a resource for small data transmission in an inactive state. The method would include not limited to: receiving a configured grant (CG) configuration which is for a small data transmission before entering an inactive state; verifying a CG resource of a camping cell associated with the CG configuration by determining whether the camping cell satisfies a validation condition before triggering a small data transmission (SDT) procedure, wherein the CG configuration comprises a list of CG configurations associated with a list of cells; and utilizing the CG resource for the SDT procedure when the validation condition has been determined as being satisfied.

In one of the exemplary embodiments, the disclosure is directed to a user equipment which includes not limited to: a transceiver operating in millimeter wave (mmWave) frequency, and a processor coupled to the transceiver and configured at least to: receive a configured grant (CG) configuration which is for a small data transmission before entering an inactive state; verify a CG resource of a camping cell associated with the CG configuration by determining whether the camping cell satisfies a validation condition before triggering a small data transmission (SDT) procedure, wherein the CG configuration comprises a list of CG configurations associated with a list of cells; and utilize the CG resource for the SDT procedure when the validation condition has been determined as being satisfied.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 8 illustrates details regarding providing reserved CG-SDT resource status in the example of the CG-SDT resource negotiation of FIG. 7 according an exemplary embodiment of the disclosure.

FIG. 9 illustrates details regarding CG-SDT resource release message in the example of the CG-SDT resource negotiation of FIG. 7 according an exemplary embodiment of the disclosure.

FIG. 20 illustrates providing reserved CG-SDT resource status in the example of the CG-SDT resource negotiation for supporting CG-SDT configuration update according a second exemplary embodiment of the disclosure.

DETAILED DESCRIPTION OF DISCLOSED EMBODIMENTS

Figure 1:
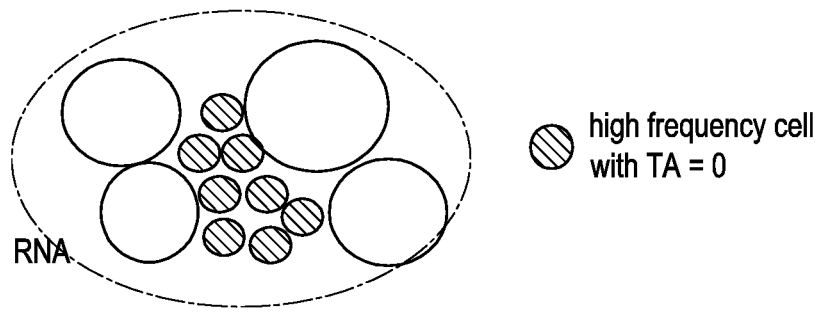
FIG. 1 illustrates a scenario in which cells operating in mmWave frequency and having small sizes exist within a RNA where the TA within one of the cells could be zero.
Figure 2:
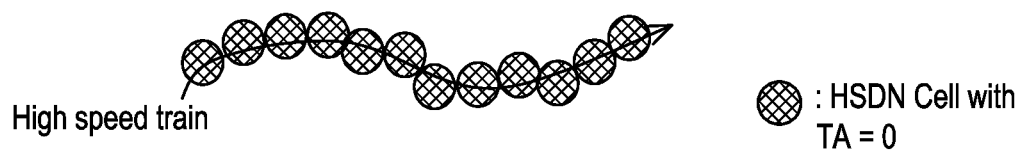
FIG. 2 illustrates a scenario in which a high-speed train traverses through multiple cells within a HSDN where the TA within one of the cells could be zero.
Figure 3:
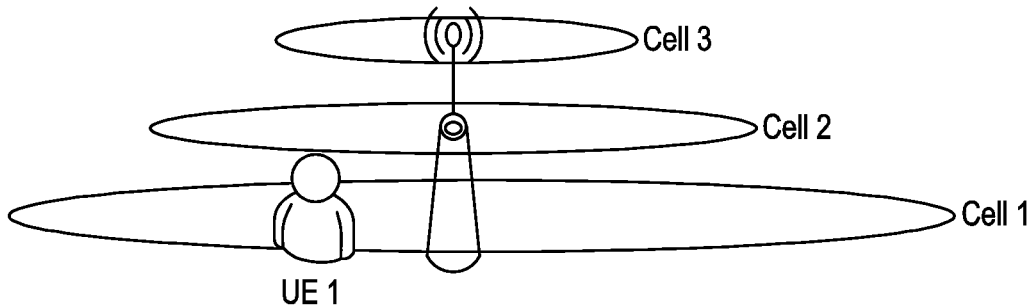
FIG. 3 illustrates a scenario in which a UE travels among a plurality of cells that are co-located where the TA within one of the cells could be zero.

Reference will now be made in detail to the present exemplary embodiments of the disclosure, examples of which are illustrated in the accompanying drawings. Wherever possible, the same reference numbers are used in the drawings and the description to refer to the same or like parts.

In resolve the previous described issues, the disclosure provides a mechanism for a UE to be configured with multiple CG-SDT configurations associated with multiple cells in order that when a UE migrates from one cell to another, the latest CG-SDT configurations of the UE would still be valid without having the UE to undergo unnecessary signaling and configuration procedures so as to potentially alleviate the burden of a network by reducing signaling overhead and by allowing the network to re-distribute UEs operating under an inactive state so as to better achieve load rebalancing. The inventive concept of the disclosure is shown in FIG. 4 and FIG. 5 and described by their corresponding written descriptions.

Figure 4:
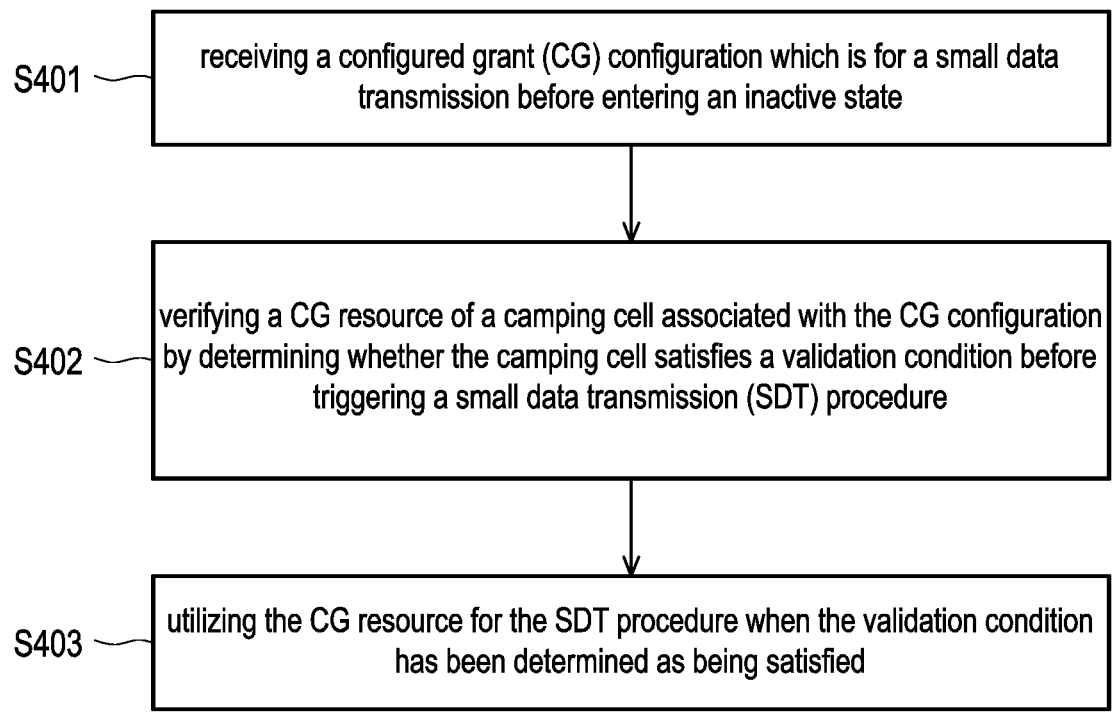
FIG. 4 illustrates a method used by a UE to preconfigure a resource for small data transmission in an inactive state according an exemplary embodiment of the disclosure.

FIG. 4 illustrates a method used by a UE to preconfigure a resource for small data transmission in an inactive state according an exemplary embodiment of the disclosure. In step S401, the UE would receive a configured grant (CG) configuration which is for a small data transmission before entering an inactive state. In step S402, the UE would verify a CG resource of a camping cell associated with the CG configuration by determining whether the camping cell satisfies a validation condition before triggering a small data transmission (SDT) procedure. The CG configuration may include a list of CG configurations associated with a list of cells. In step S403, the UE would utilize the CG resource for the SDT procedure when the validation condition has been determined as being satisfied.

Figure 5:
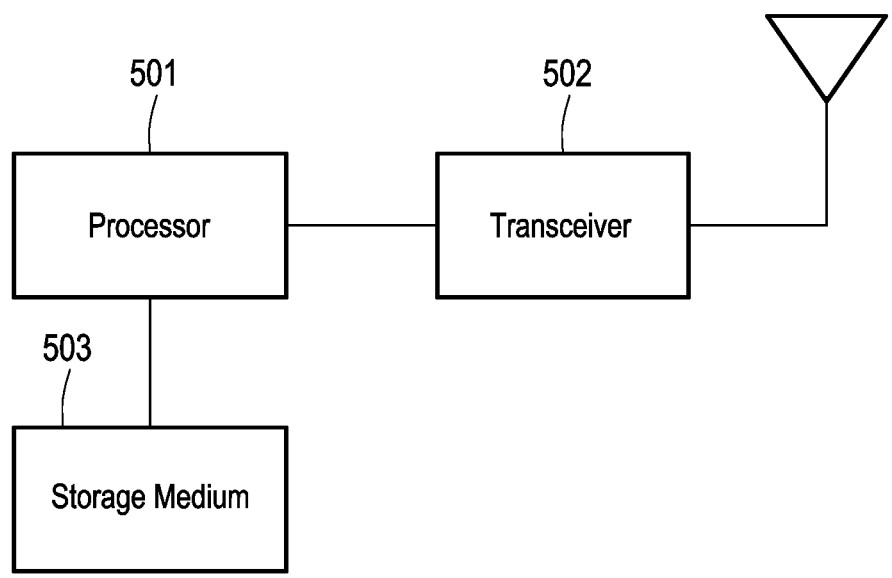
FIG. 5 illustrates a partial hardware block diagram of a UE according an exemplary embodiment of the disclosure.

FIG. 5 illustrates a partial hardware block diagram of a UE that uses the method described in FIG. 4. The UE may include not limited to a hardware processor 501, a wireless transceiver 502, and a non-transitory storage medium 503. The hardware processor 501 is electrically connected to the wireless transceiver 502 and the non-transitory storage medium 503 and configured at least for implementing the method as described in FIG. 4 and subsequent exemplary embodiments.

The transceiver 502 could be one or more integrated or separate transceiver modules, and each of the transceiver modules may include one or more integrated or separated transmitters and receivers configured to transmit and receive signals respectively in the radio frequency or in the mmWave frequency. The transceiver 502 may also perform operations such as low noise amplifying, impedance matching, frequency mixing, up or down frequency conversion, filtering, amplifying, and so forth. The transceiver 502 may each include one or more analog-to-digital (A/D) and digital-to-analog (D/A) converters which are configured to convert from an analog signal format to a digital signal format during uplink signal processing and from a digital signal format to an analog signal format during downlink signal processing. The transceiver 502 may each further include an antenna array which may include one or multiple antennas to transmit and receive omni-directional antenna beams or directional antenna beams.

The hardware processor 501 is configured to process digital signals and to perform procedures of the proposed method in accordance with the proposed exemplary embodiments of the disclosure. Also, the hardware processor 501 may access the non-transitory storage medium 503 which stores programming codes, codebook configurations, buffered data, and record configurations assigned by the hardware processor 501. The hardware processor 501 could be implemented by using programmable units such as a microprocessor, a micro-controller, a DSP chips, FPGA, etc. The functions of the hardware processor 501 may also be implemented with separate electronic devices or ICs. It should be noted that the functions of hardware processor 501 may be implemented with either hardware or software.

Figure 6:
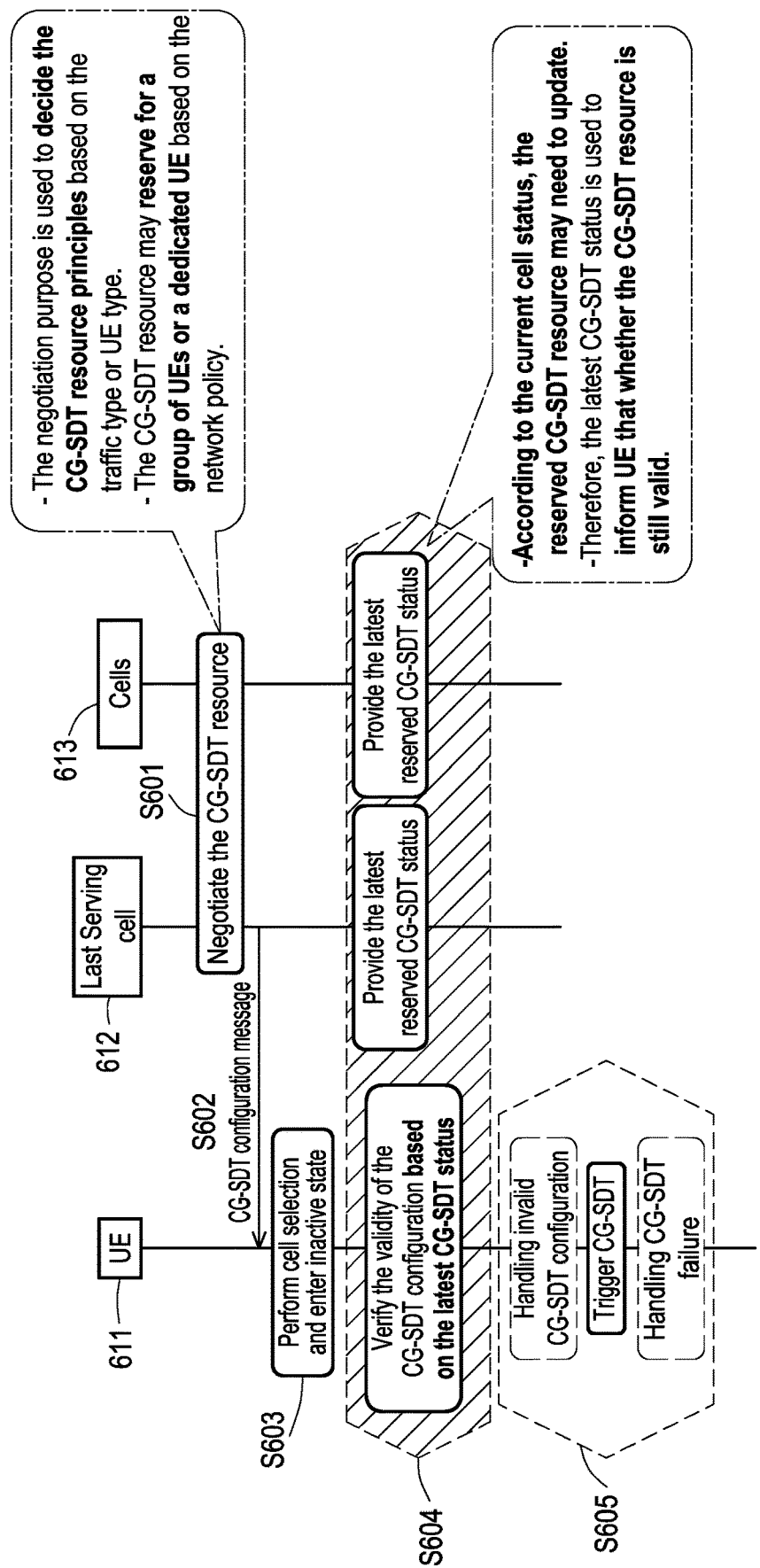
FIG. 6 illustrates a procedure of configuring multiple CG configurations associated with multiple cells including at least a CG-SDT resource adjustment procedure and a CG-SDT failure handling procedure according an exemplary embodiment of the disclosure.

In order to further elucidate the inventive concept as shown in FIG. 4 and FIG. 5 and described by their corresponding written descriptions, the disclosure provides various exemplary embodiments as shown in subsequent figures and described in their corresponding written descriptions. FIG. 6 is a signaling diagram which describes a procedure to configure multiple CG configurations associated with multiple cells as an overview of the various exemplary embodiments. The procedure of FIG. 6 to configure multiple CG configurations associated with multiple cells may include a CG-SDT resource adjustment procedure S604 and a CG-SDT failure handling procedure S605. In general, the CG resource of a cell is typically divided into several CG resource sets as each CG resource set may have a predetermined resource location, resource size, periodicity, characteristics, and etc. Each CG resource set is associated with a different CG-SDT resource configuration and thus could be procured by selecting the corresponding CG-SDT resource configuration. The disclosure would allow a UE operating under an inactive state to obtain resources for SDT as the UE migrates from cell to cell with the by obtaining a CG-SDT resource configuration which could be utilized once determined to be valid.

The implementation of FIG. 6 is as follows. In step S601, a last serving cell 612 of a UE 611 would negotiate a CG resource used for a SDT procedure (CG-SDT resource) with multiple nearby cells 613 in a network. The purpose of step S601 is to decide on a common CG-SDT resource principle out of multiple CG-SDT resource principles based on a traffic type or a type of the UE 611. The CG-SDT resource could be a resource that is reserve for a dedicated UE (e.g. 611) or a group of UEs based on the network policy. In step S602, the last serving cell 612 of the UE 611 would transmit a message (i.e. CG-SDT configuration message) which includes a CG configuration to be used for SDT (CG-SDT configuration) to the UE 611. The CG-SDT configuration message includes a CG configuration that is to be used by the UE 611 for an upcoming SDT procedure. In step S603, the UE 611 would perform a cell selection among the cells 613 before entering into an inactive state which could be, for example, a sleep mode, a low power mode, or be turned off.

In step S604, the UE may perform a CG-SDT resource adjustment procedure S604 during which the UE 611 would verify the validity of the CG-SDT configuration based on the latest reserved CG-SDT status while both the last serving cell 612 and the multiple nearby cells 613 would provide the latest reserved CG-SDT status. Thus, according to the current cell status, the reserved CG-SDT status may need to be updated. Therefore, the latest reserved CG-SDT status is used to inform the UE 611 whether the CG-SDT resource is still valid. Since a status of any cell within the multiple cells 613 may change over time, each cell may need to adjust its reserved CG-SDT resource. The adjustments of the reversed CG-SDT resources may result in the UE (e.g. 611) being in an inactive state needing to check the validity of the CG-SDT configuration of a cell after camping on the cell before triggering a procedure to perform a SDT by using the CG resource (i.e. CG-SDT transmission). In step S605, the UE 611 may perform a CG-SDT failure handling procedure S605. The CG-SDT failure handling procedure S605 may include two cases where case #1 involves handling a CG-SDT transmission failure and case #2 involves handling the CG-SDT configuration being invalid.

For the CG-SDT resource adjustment procedure S604, the disclosure provides two different exemplary embodiments which may affect how the latest reserved CG-SDT resource status information is provided by a cell in a different way. For the first exemplary embodiment, a cell is allowed to configure and release the configuration of a CG-SDT resource. For the second exemplary embodiment, a cell is allowed to modify the configuration of a CG-SDT resource such as to configure, reconfigure, update, and release the configuration of a CG-SDT resource. For the first exemplary embodiment, the UE (e.g. 611) may acquire a CG-SDT resource configuration before entering into an inactive state. For the second exemplary embodiment, the UE (e.g. 611) may acquire a valid CG-SDT resource configuration right before triggering a CG-SDT procedure or right after verifying the CG-SDT resource configuration is invalid.

Figure 22:
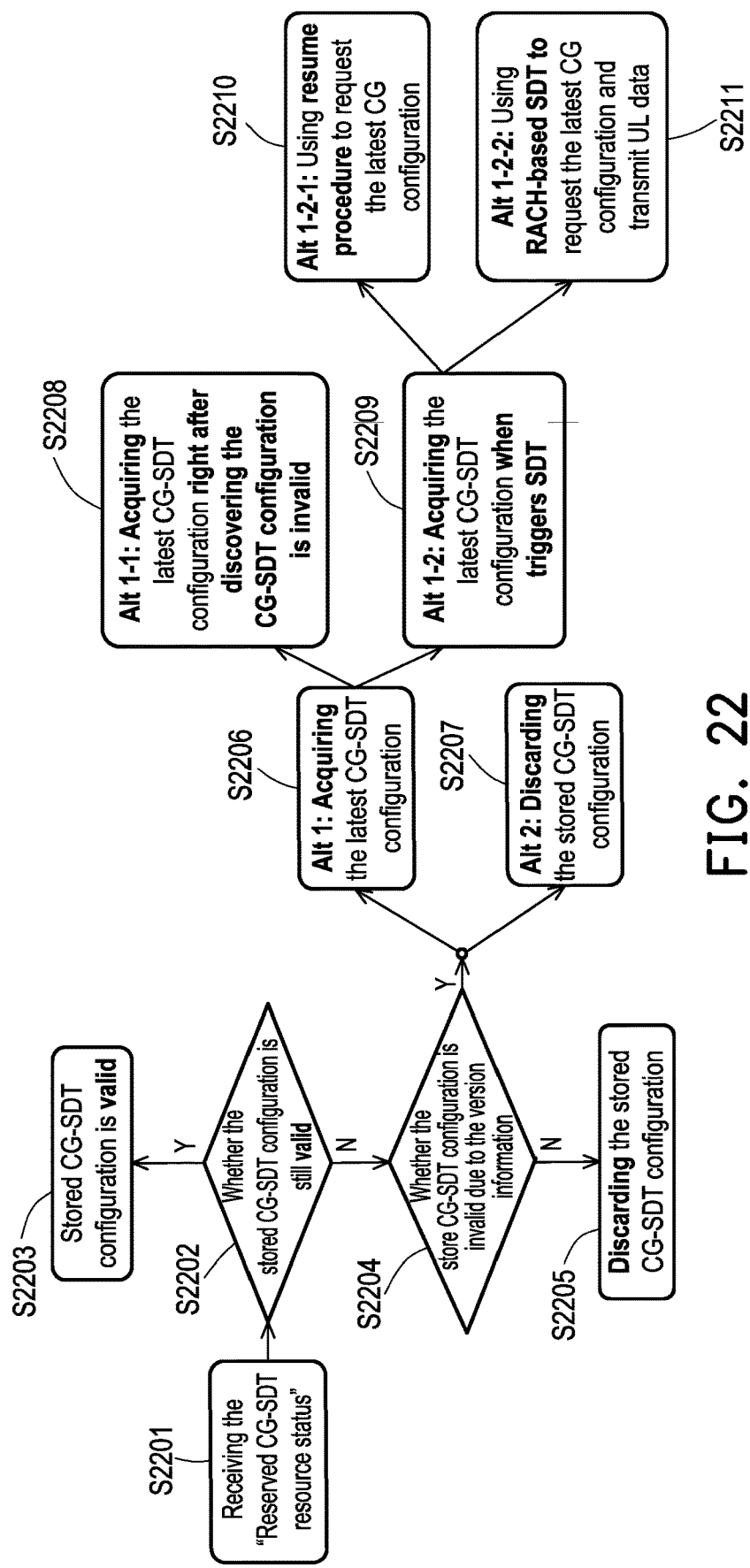
FIG. 22 illustrates an example of a UE triggering a CG-SDT with supporting CG-SDT resource update according a second exemplary embodiment of the disclosure.
Figure 27:
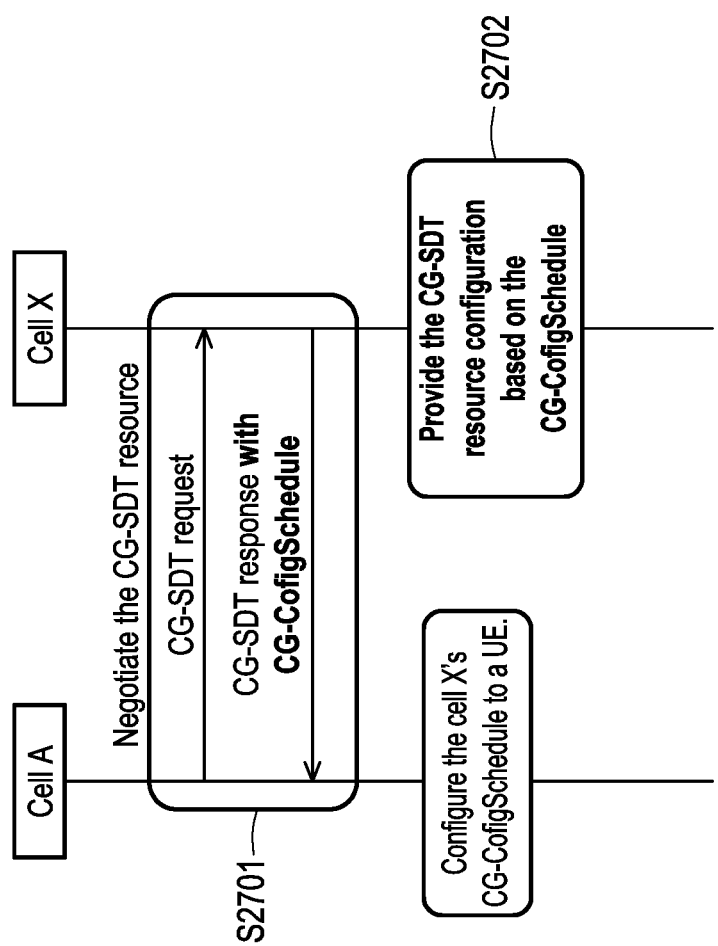
FIG. 27 illustrates an example of using CG-Cofigschedule to describe how the camping cell will provide CG-SDT resource configuration according an exemplary embodiment of the disclosure.

The general concept of the second exemplary embodiment is at least shown in FIG. 22 of the disclosure. For both the first embodiment and the second embodiment, the UE would obtain the CG-SDT resource set configuration of the camping cell in the previous serving cell. FIG. 27 describes an alternative where the UE may not obtain the CG-SDT resource set configuration of the camping cell in the previous serving cell. Instead, the UE may obtain CG-CofigSchedule from the camping cell. Thus, CG-CofigSchedule could be used by the camping cell for scheduling its own scheduling CG-SDT resource set configuration. Therefore, the UE may use the CG-CofigSchedule to obtain the CG-SDT resource set configuration of the camping from the camping cell itself.

To further expand upon the overview of a procedure to configure multiple CG configurations associated with multiple cells of FIG. 6, the subsequent disclosure provides more detailed explanations. FIG. 7~17 are examples directed toward the first exemplary embodiment in which a UE may acquire a CG-SDT resource configuration before entering into an inactive state. FIG. 19~32 are examples directed toward the second exemplary embodiment in which a UE may acquire a CG-SDT resource configuration right before triggering a CG-SDT procedure.

Figure 7:
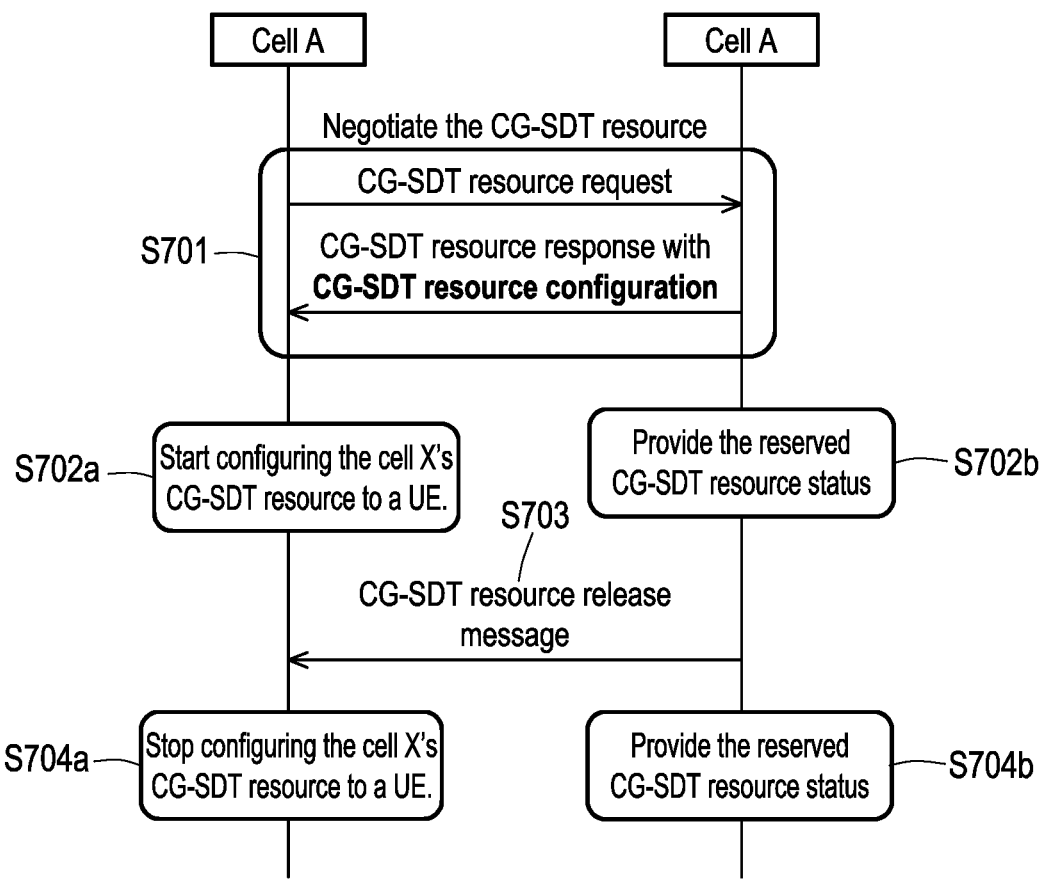
FIG. 7 illustrates an example of a CG-SDT resource negotiation according an exemplary embodiment of the disclosure.

FIG. 7 shows an example of a CG-SDT resource negotiation procedure (e.g. S601) between cell A and cell X based on the first exemplary embodiment in which the UE may acquire a CG-SDT resource configuration before entering into an inactive state. Referring to FIG. 7, in step S701, Cell A and Cell X may perform a negotiation of a CG-SDT resource. Cell A may initiate the negotiation by transmitting a CG-SDT resource request message. In response to receiving the CG-SDT resource request message, Cell X may transmit to Cell A a CG-SDT resource response message which would include a CG-SDT resource configuration.

A CG-SDT resource for a cell could be reserved for another cell or could be reserved a cell group depending on the network policy and the conditions of the cell. The CG-SDT resource of Cell X could be divided into serval CG-SDT resource sets as each CG-SDT resource set may have a different resource size, a different periodicity, a different characteristic, and etc. Each CG-SDT resource set could be configured by a CG-SDT resource configuration. Thus, once Cell X has received another cell's (e.g. cell A) CG-SDT resource request, cell X could reserve the CG-SDT resource set to cell A and provides the corresponding CG-SDT resource configurations within the CG-SDT resource response message. Cell X could use the information of CG-SDT resource request message to determine how to reserve the CG-SDT resource. For example, if Cell A requests a CG-SDT resource with a small resource size and a short periodicity, Cell X could reserve this kind of CG-SDT resource set to cell A. According to the information in the CG-SDT resource request message, Cell X may be able to provide multiple CG-SDT resource sets to Cell A.

After performing the negotiation of the CG-SDT resource S701, then in step S702a, Cell A may start configuring Cell X's CG-SDT resource to a UE. Also, in step S702b, Cell X may provide the latest reserved CG-SDT resource status. The purpose of the reserved CG-SDT resource status is to inform the UE currently camping in Cell A and operating under an inactive state about the stored status of the CG-SDT configuration of Cell X. Thus, according to the latest reserved CG-SDT resource status, the UE that operates under the inactive state may decide to release or update or use the stored CG-SDT configuration of Cell X.

FIG. 8 shows different types of reserved CG-SDT resource status which could be cell-based 801, CG-SDT configuration based 802, or hybrid 803. For cell-based reserved CG-SDT resource status 801, the reserved CG-SDT resource status could be either valid or invalid for each reserved objective which may include a number of cells such as Cell A, Cell B, and etc. In this example, both Cell A and Cell B contain valid reserved CG-SDT resource status, and it means that all CG-SDT configuration that is reserved to Cell A and Cell B are valid. For CG-SDT configuration based reserved CG-SDT resource status 801, the reserved CG-SDT resource status could be either valid or invalid for each different CG-SDT configuration identifier (ID). The CG-SDT configuration ID of each CG-SDT configuration could be unique. In this example, both CG configuration 1 and CG configuration 2 contain valid reserved CG-SDT resource status. Moreover, when the type of reserved CG-SDT resource status is hybrid 803, then both cell-based reserved CG-SDT resource status and CG-SDT configuration based reserved CG-SDT resource status are adopted and combined. For the hybrid type of reserved CG-SDT resource status 803, a reserve objective which is a cell may support multiple CG-SDT configurations, and each CG-SDT configuration could be valid or invalid. In the example of FIG. 8, Cell B supports CG-SDT configuration 1 and CG-SDT configuration 2, and both of the CG-SDT configurations are valid.

Next, referring back to FIG. 7, after steps S702a and S702b are finished, in step S703 Cell X may transmit a CG-SDT resource release message to Cell A. In response to receiving the CG-SDT resource release message, Cell A may stop configuring the CG-SDT resource of Cell X to the UE (e.g. 611), and Cell X may provide the latest reserved CG-SDT resource status. Once the cell condition of cell X changed, for example, loadings have become heavy, Cell X may decide to release some reserved CG-SDT resources. To accomplish such, Cell X could use the CG-SDT resource release message of step S703 to inform reserved objective (e.g. Cell A) which CG-SDT configuration will be released. After receiving the CG-SDT resource release message from cell X, cell A would stop configuring to the UE the CG-SDT resource that has been released by Cell X.

FIG. 9 shows an example of updating the reserved CG-SDT resource status by Cell X. Assuming that the reserved CG-SDT resource status is cell based (e.g. 801), then Cell X may release a CG-SDT configuration by deleting an entry associated with a reserved objective. For example, in order to release a CG-SDT configuration, in step S801 Cell X may delete the entry corresponding to the released CG-SDT configuration from the reserved CG-SDT resource status so as to represent that the CG-SDT configuration corresponding to Cell X is invalid. Similarly, assuming that the reserved CG-SDT resource status is CG-SDT configuration based (e.g. 802), then Cell X may release a CG-SDT configuration by changing the status of a CG-SDT resource ID. For example, in order to release a CG-SDT configuration, in step S802 Cell X may change or tag the status of the CG-SDT resource ID corresponding to the released CG-SDT configuration as invalid from the reserved CG-SDT resource status so to represent that a CG-SDT resource corresponding to a CG-SDT configuration ID has been released.

Figure 10:
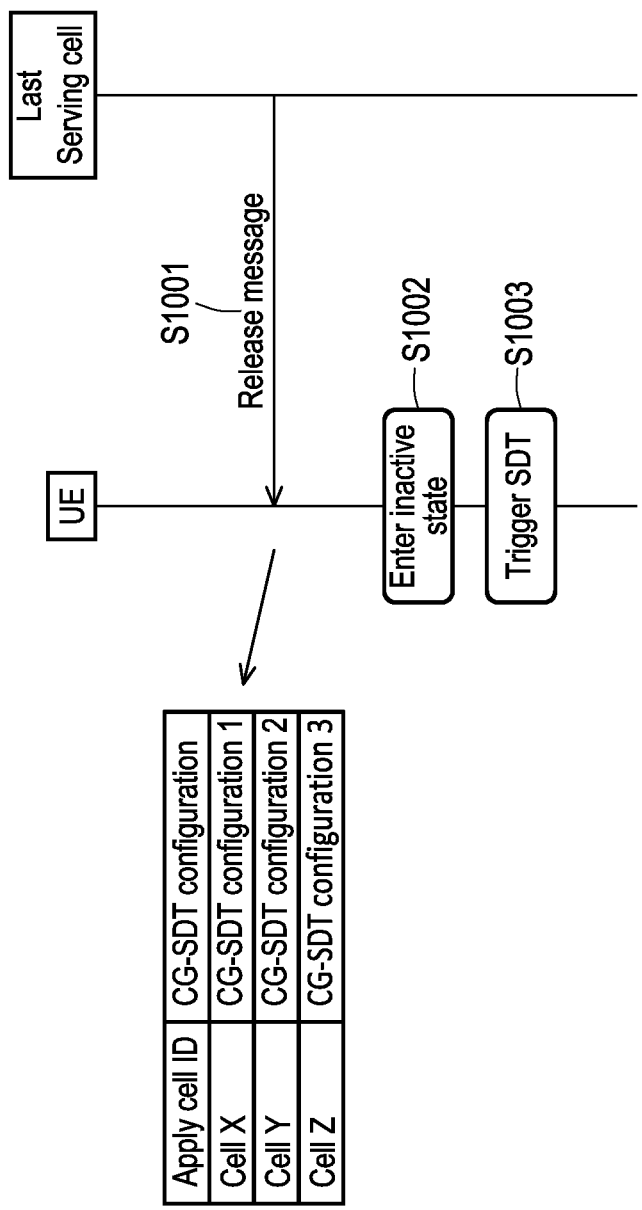
FIG. 10 illustrates an example of a CG-SDT resource configuration according an exemplary embodiment of the disclosure.

Next, referring to FIG. 10, in step S1001 a last serving cell (e.g. 612 or cell A) may transmit to the UE (e.g. 611) a release message which may include not limited to a suspend indicator, an inactive state configuration, a SDT configuration, and a CG-SDT configuration. In response to receiving the release message, in step S1002, the UE may enter an inactive state. After being in an inactive state, in step S1003, a SDT could be triggered. The suspend indicator is used to inform the UE to enter into an inactive state. The inactive state configuration may include not limited to a I-radio network temporary identifier (I-RNTI), radio network access (RAN) networking area (RNA) configuration, and security related information. The SDT configurations may include information related to the SDT parameters such as SDT trigger conditions, applied DRB information, and etc. The CG-SDT configuration may include entries which describes which CG-SDT configuration is to be applied for each cell ID.

In the example of FIG. 10, CG-SDT configuration 1 is to be applied to Cell X, CG-SDT configuration 2 is to be applied to Cell Y, and so forth. Each different CG-SDT resource configuration may at least include a CG-SDT configuration ID, a CG-SDT resource location, a CG_Timer, a CG resource size, a periodicity, and some L1 parameters such as demodulation reference signal (DMRS) and CG-RNTI used to transmit SDT. The DMRS and CG-RNTI could be used by the UE to transmit an uplink (UL) data at the reserved CG resource. UE may also use the configured DMRS to transmit SDT and may use CG-RNTI to scramble the SDT data.

Figure 11:
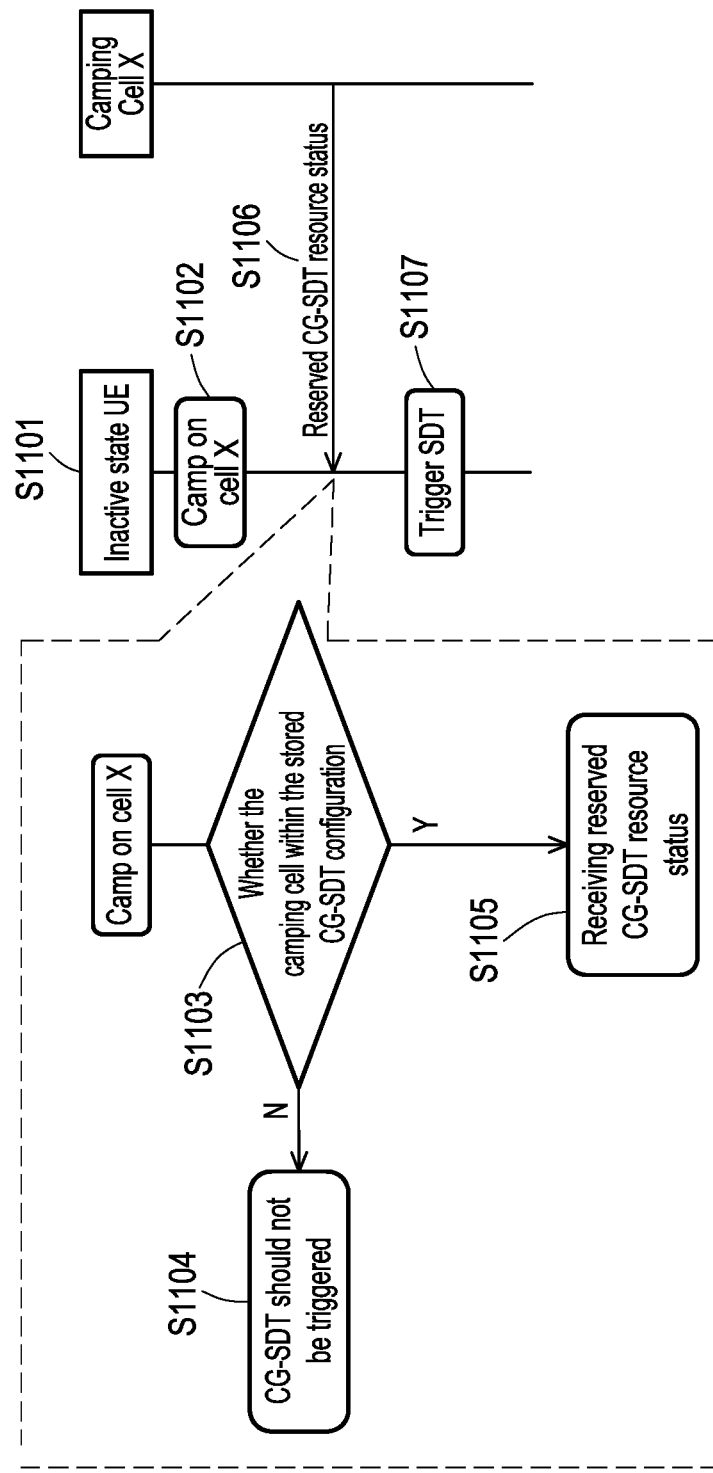
FIG. 11 illustrates an example of a UE triggering CG-SDT according an exemplary embodiment of the disclosure.

Assuming that the UE has migrated from the last serving cell and is camping at Cell X, the UE would determine whether a CG-SDT could be triggered. FIG. 11 shows an example of a UE determining whether to trigger a CG-SDT while camping on Cell X. In step S1101, the UE is assumed to have entered into an inactive state. In step S1102, while the UE camps on Cell X, in step S1103 the UE may determine whether to receive the latest reserved CG-SDT resource status by determining whether the camping cell (e.g. Cell X) is found within a stored CG-SDT configuration. If Cell X is not within the stored CG-SDT configuration, then in step S1104, the UE would have determined that a CG-SDT should not be triggered. If Cell X is within the stored CG-SDT configuration, then in step S1105, the UE would receive the latest reserved CG-SDT resource status. In that case, in step S1106, the UE would receive the reserved CG-SDT resource status from Cell X. In step S1107, the UE may trigger a SDT.

Figure 12:
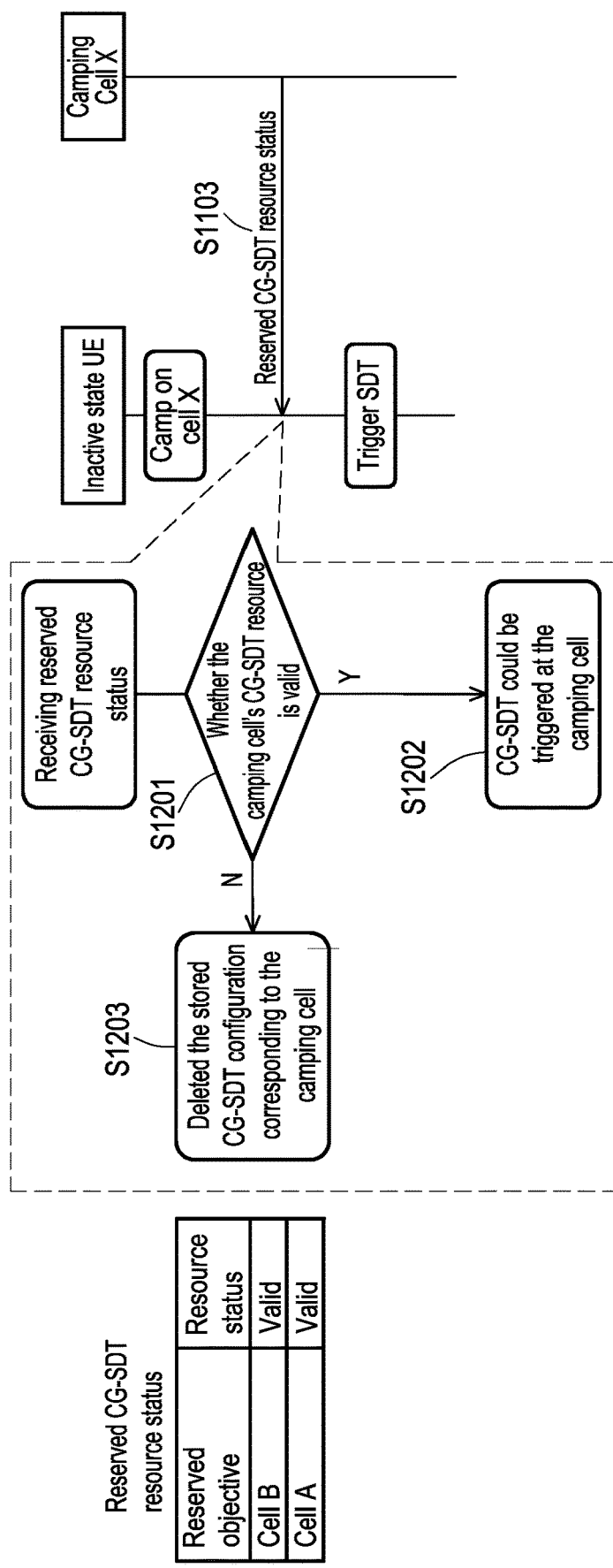
FIG. 12 shows an example of a UE triggering CG-SDT when the reserved CG-SDT resource status is cell based according an exemplary embodiment of the disclosure.
Figure 13:
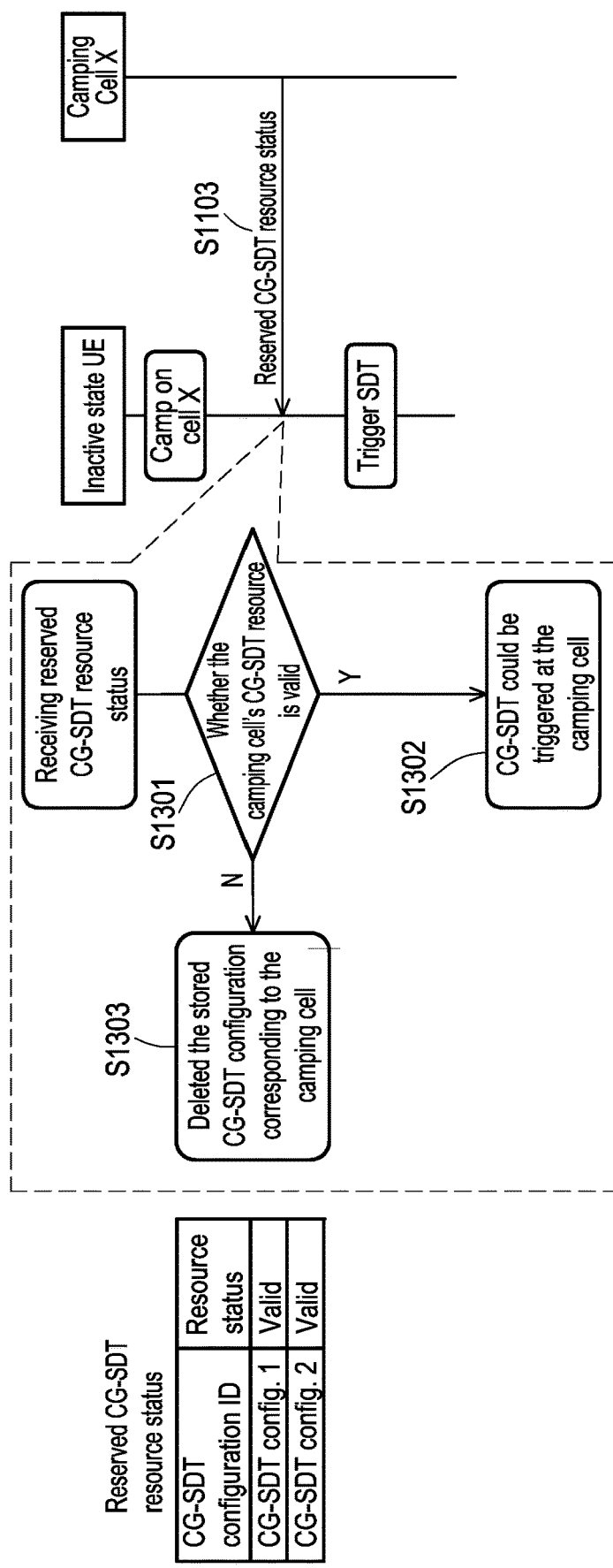
FIG. 13 shows an example of a UE triggering CG-SDT when the reserved CG-SDT resource status is CG-SDT configuration based according an exemplary embodiment of the disclosure.
Figure 14:
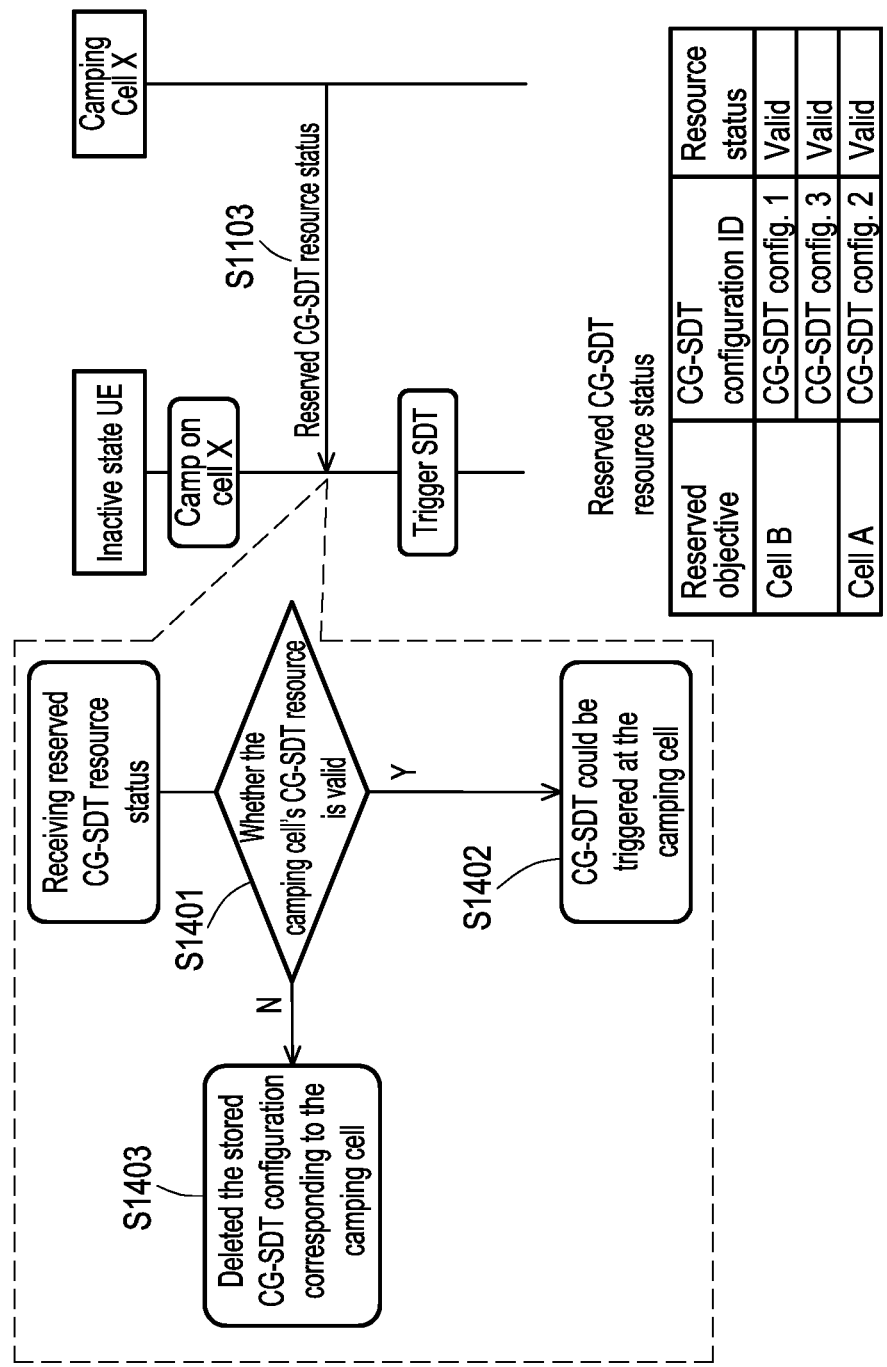
FIG. 14 shows an example of a UE triggering CG-SDT when the reserved CG-SDT resource status is hybrid according an exemplary embodiment of the disclosure.

FIG. 12~FIG. 14 shows different examples of a UE triggering SDTs when the reserved CG-SDT resource status is in different formats. FIG. 12 shows an example of a UE triggering CG-SDT when the reserved CG-SDT resource status is cell based. In response to receiving the reserved CG-SDT resource status (e.g. S1103) from Cell X, in step S1201, the UE would determine whether the camping cell's CG-SDT resource is valid. Assuming that the camping cell's CG-SDT resource is valid, then in step S1202, the UE would determine that a CG-SDT could be triggered at the camping cell which is Cell X. Assuming that the camping cell's CG-SDT resource is not valid, then in step S1203, the UE would delete the stored CG-SDT configuration corresponding to the camping cell. In the example of FIG. 12, the stored reserved CG-SDT resource status has entries corresponding to previous camping cells which are Cell A and Cell B. This means that only if the last serving cell is Cell A or Cell B, reserved CG-SDT resource status would only be valid. If the UE's last serving cell is not Cell A or Cell B, then the CG-SDT configuration of Cell X would be invalid, and the UE would then delete any entry containing Cell X in the reserved CG-SDT resource status if any exists.

FIG. 13 shows an example of a UE triggering CG-SDT when the reserved CG-SDT resource status is CG-SDT configuration based. In response to receiving the reserved CG-SDT resource status (e.g. S1103) from Cell X, in step S1301, the UE would determine whether the camping cell's CG-SDT resource is valid. Assuming that the camping cell's CG-SDT resource is valid, then in step S1302, the UE would determine that a CG-SDT could be triggered at the camping cell which is Cell X. Assuming that the camping cell's CG-SDT resource is not valid, then in step S1303, the UE would delete the stored CG-SDT configuration corresponding to the camping cell. In the example of FIG. 13, the stored reserved CG-SDT resource status has entries corresponding to CG-SDT configuration 1 and CG-SDT configuration 2. This means that only if the CG-SDT configuration ID of cell X is CG-SDT configuration 1 or CG-SDT configuration 2, then the configured CG-SDT resource is valid. Otherwise, the CG-SDT configuration of cell X is invalid if the CG-SDT configuration ID of cell X is neither CG-SDT configuration 1 nor CG-SDT configuration 2, and the UE would then delete any entry containing Cell X in the reserved CG-SDT resource status if any exists.

FIG. 14 shows an example of a UE triggering CG-SDT when the reserved CG-SDT resource status is hybrid. In response to receiving the reserved CG-SDT resource status (e.g. S1103) from Cell X, in step S1401, the UE would determine whether the camping cell's CG-SDT resource is valid. Assuming that the camping cell's CG-SDT resource is valid, then in step S1402, the UE would determine that a CG-SDT could be triggered at the camping cell which is Cell X. Assuming that the camping cell's CG-SDT resource is not valid, then in step S1403, the UE would delete the stored CG-SDT configuration corresponding to the camping cell. In the example of FIG. 14, if the last serving cell is cell B, and the CG-SDT configuration ID of cell X is either CG-SDT configuration 1 or CG-SDT configuration 3, then the configured CG-SDT resource of Cell X would be considered as being valid. Similarly, if the last serving cell of the UE is Cell A and the CG-SDT configuration ID of cell X is CG-SDT configuration 2, then the configured CG-SDT resource for Cell X would be considered as being valid. Otherwise, the CG-SDT configuration of Cell X would be considered as being invalid.

Figure 15:
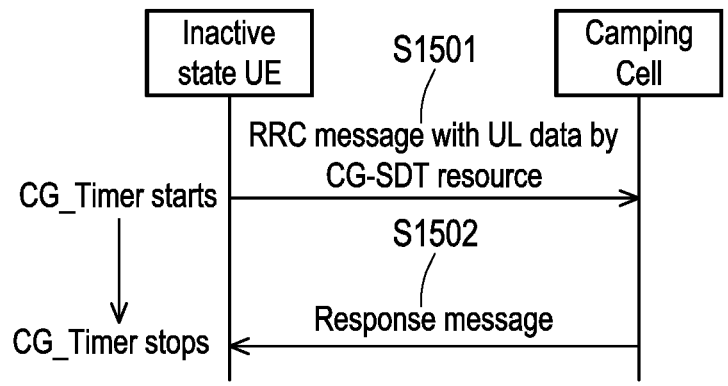
FIG. 15 illustrates a procedure of determining CG-SDT transmission success or failure based on the first exemplary embodiments of the disclosure.
Figure 15:
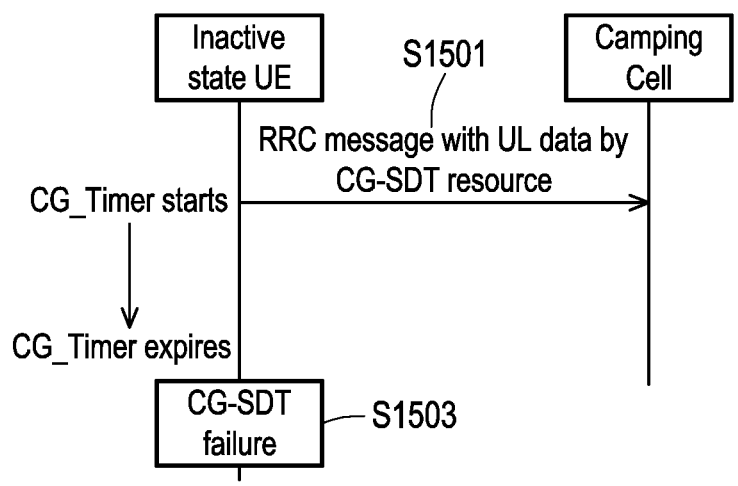

After performing the CG-SDT resource adjustment procedure (e.g. S604), if a CG-SDT configuration is valid, UE could trigger CG-SDT transmission. If a CG-SDT transmission is unsuccessful, the UE may perform a CG-SDT failure handing procedure to cope the CG-SDT transmission failures. FIG. 15 shows a procedure of determining CG-SDT transmission success or failure based on the first exemplary embodiments of the disclosure. In step S1501, the UE in an inactive state may transmit a radio resource control (RRC) message which carries an UL data within a CG-SDT resource to the camping cell. The CG-SDT resource is a reserved CG-SDT resource which could be dedicated for the UE or shared among a group of UEs depending on the network policy. After step S1501, the UE would wait for a response message and would determine whether the response message is received within a time window as defined by CG_Timer. The purpose of the response message is to inform the UE whether the CG-SDT has been successful. The response message could be transmitted via a Layer 1 message such via an acknowledgement (ACK) message, a media access control (MAC) control element (CE), or a RRC SDT complete message. The UE may also use CG-RNTI configured by the CG resource configuration to receive the response message.

When the UE transmit a small data by using the CG-SDT resource, the CG_Timer will start. When the UE receives the response message, the CG_Timer will stop. In step S1502, the UE would receive from the camping cell as response message. If the response message is received before CG_Timer expires, then CG-SDT could be considered successful. In the top signaling diagram FIG. 15, assuming that the response message is received before CG_Timer expires, the CG-SDT has been successful. In the bottom signaling diagram of FIG. 15, the response message is either received after the CG_Timer has expired or has not been received at all, then the CG-SDT has been considered as having been failed. Assuming that the CG-SDT has failed, then in step S1503, three different methods could be utilized to handle the CG-SDT failure as a part of the CG-SDT failure handling procedure (e.g. S605).

Figure 16:
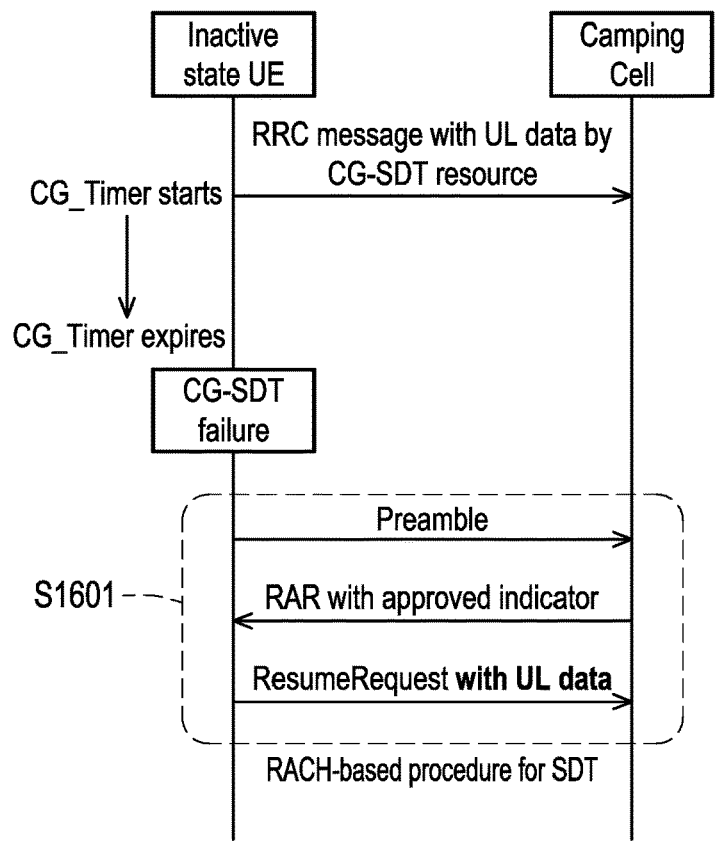
FIG. 16 illustrates method 1 of handing the CG-SDT transmission failure based on the first exemplary embodiments of the disclosure.
Figure 17:
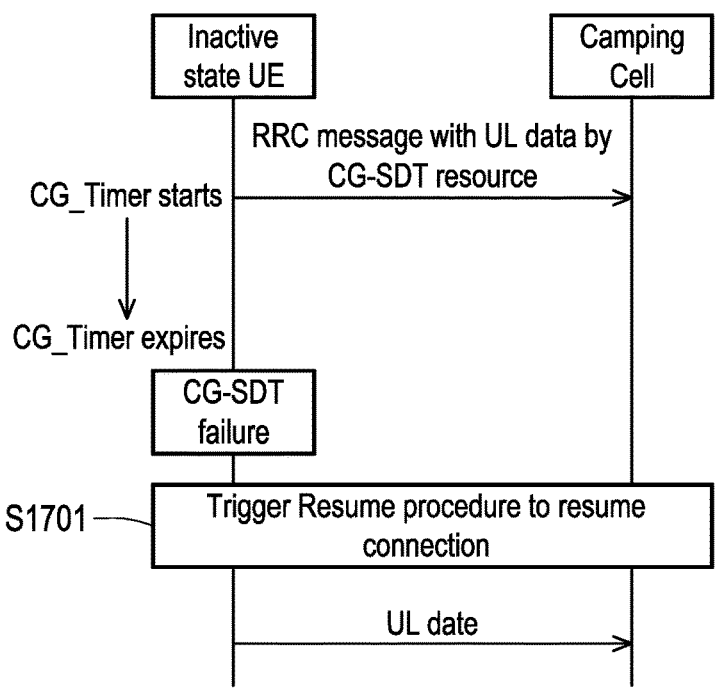
FIG. 17 illustrates method 2 of handing the CG-SDT transmission failure based on the first exemplary embodiments of the disclosure.
Figure 18:
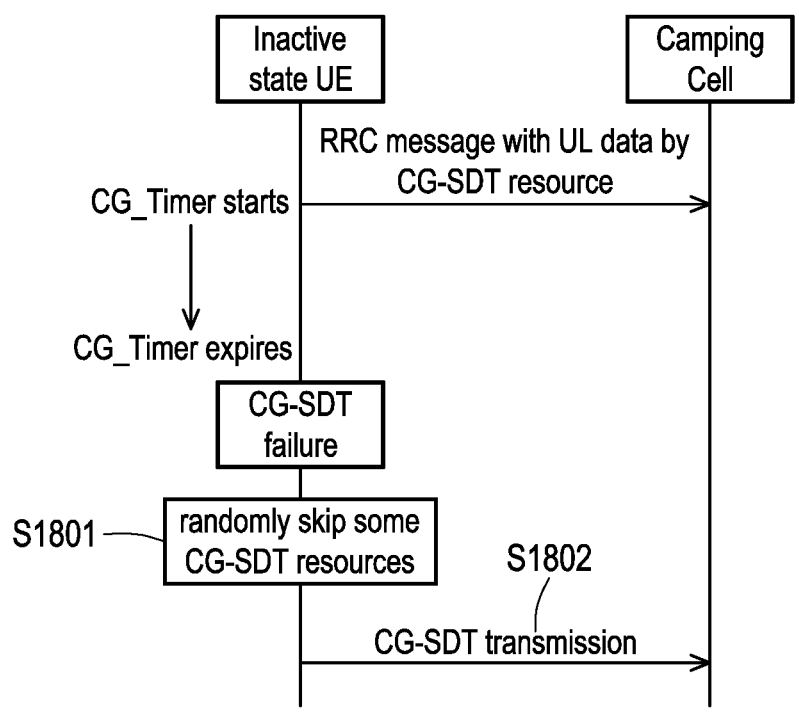
FIG. 18 illustrates method 3 of handing the CG-SDT transmission failure based on the first exemplary embodiments of the disclosure.

FIG. 16~FIG. 18 shows three methods of the handing a CG-SDT transmission failure while performing the CG-SDT failure handling procedure (e.g. S605). In Method 1, the UE in an inactive state could use a random-access channel (RACH)-based procedure to re-try the SDT assuming that the RACH-based procedure has been enabled b the camping cell. In Method 2, the UE in an inactive state may fallback to a resume procedure to resume the transmission. In Method 3, the UE in an inactive state may randomly skip over some CG-SDT resources and trigger a CG-SDT by using a CG-SDT resource.

Referring to the signaling diagram of Method 1 as shown in FIG. 16, before step S1601, the UE in an inactive state may start a timer which is set for a specific duration according to the parameter CG_Timer, and the UE would subsequently use a CG-SDT resource to transmit a RRC message which carries UL data. UE would then determine whether there is a CG-SDT failure based on whether a corresponding response message is received before CG_Timer has expired. Assuming that a CG-SDT failure has occurred, then in step S1601, the UE in an in active state the inactive state UE could use a RACH-based SDT procedure to re-attempt the SDT, if the RACH-based SDT procedure has been enabled by the camping cell. The RACH-based SDT procedure includes the UE transmitting a dedicated preamble reserved for the RACH-based SDT procedure to request for an UL resource for the RACH-based SDT. If the random-access response (RAR) includes an indicator which indicates that the request has been approved, then the UE would use the UL resource indicated in the RAR to transmit a ResumeRequest message which carries the UL data for the RACH-based SDT. If the RAR does not indicate approval, then the UE should perform a resume procedure to resume the connection with the camping cell. The UE will send a ResumeRequest with UL data by the UL resource indicated in the RAR. Subsequently, the camping cell may respond to step S1601 by transmitting a release message to the UE to indicate the UE to return to the inactive state operation.

Referring to the signaling diagram of Method 2 as shown in FIG. 17. Before step S1701, the operation is assumed to be the same or similar to the operation of Method 1. In step S7101, UE in an inactive state may fallback to use a resume procedure to resume the connection with the camping cell. The inactive state UE may also use the signaling involved in the resume procedure or an additional signaling to transmit the UL data. In other words, the UL data could be embedded in the signaling of the resume procedure or be a part of an additional signaling subsequent to the resume procedure.

Referring to the signaling diagram of Method 3 as shown in FIG. 18. Before step S1801, the operation is assumed to be the same or similar to the operation of Method 1. In step S1801, the UE in an inactive state may randomly skip one or some CG-SDT resource(s). In step S1802, the UE may trigger a CG-SDT by using a randomly selected CG-SDT resources subsequent to the skipped CG-SDT resource(s). For example, the UE may randomly skip $N_{th}$ CG-SDT resources and trigger the CG-SDT at the $(N+1)_{th}$ CG-SDT resource where N is an integer greater than zero.

Next, the subsequent disclosure is directed to the second exemplary embodiment in which a UE may acquire a CG-SDT resource configuration right before triggering a CG-SDT procedure. For the first exemplary embodiment, the CG-SDT configuration only involves procedures related to configuration and release but the CG-SDT configuration is not updated. However, since the conditions of a cell and its CG-SDT situation does not remain static, a CG-SDT configuration may need to be updated in order to optimize the utilization of resources and the success rate of a CG-SDT. For example, when the loading of a cell becomes heavy, the success rate of a CG-SDT may decrease, and thus the CG-SDT resources may need to updated.

Figure 19:
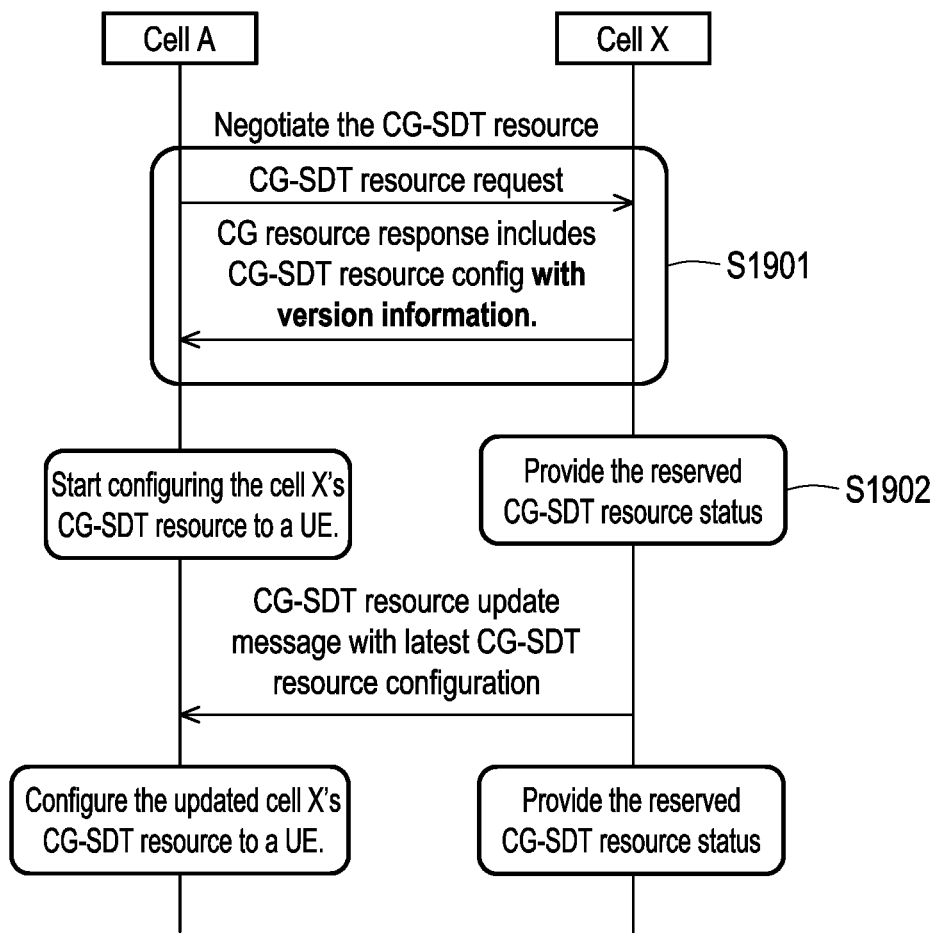
FIG. 19 illustrates an example of a CG-SDT resource negotiation according a second exemplary embodiment of the disclosure.

FIG. 19 shows an example of a CG-SDT resource negotiation procedure (e.g. S601) between cell A and cell X based on the second exemplary embodiment in which the UE may acquire a CG-SDT resource configuration before entering into an inactive state, and a cell is allowed to modify the CG-SDT configuration such as by re-configuring, releasing, and updating the CG-SDT configuration. In addition, another purpose of the CG-SDT negotiation is to support the CG-SDT configuration update. Referring to FIG. 19, in step S1901, Cell A and Cell X may perform a negotiation of a CG-SDT resource. Cell A may initiate the negotiation by transmitting a CG-SDT resource request message. In response to receiving the CG-SDT resource request message, Cell X may transmit to Cell A a CG-SDT resource response message which would include a CG-SDT resource configuration and additionally a version information.

The CG-SDT resource negotiation procedure of FIG. 19 is very similar to the resource negotiation procedure of FIG. 7. However, for this example, the CG-SDT configuration of cell X may be updated due to the change of conditions experienced by cell X. A configuration version could be adopted to assist a UE to verify whether the CG-SDT configuration has been updated. To support an CG-SDT resource update, the cell (i.e. Cell X) that reserves the CG-SDT resource cell would need to provide the version information of the CG-SDT configuration in order to the request a CG-SDT resource from another cell (e.g. Cell A).

After Cell A negotiates the CG-SDT resource with Cell X, in step S1902, Cell X has to provide the reserved CG-SDT resource status. Also, another main purpose of providing reserved CG-SDT resource status is for Cell X to provide Cell A with the CG-SDT version information so as to support the CG-SDT resource (or configuration) update. FIG. 20 shows different types of reserved CG-SDT resource status which could be cell-based 2001, CG-SDT configuration based 2002, or hybrid 2003. For cell-based reserved CG-SDT resource status 2001, the reserved CG-SDT resource status includes a version number of the CG-SDT resource configuration for each reserved objective which may include a number of cells such as Cell A, Cell B, and etc. For CG-SDT configuration based reserved CG-SDT resource status 2002, each different CG-SDT configuration ID could be associated with a version number. In this example, CG configuration 1 is associated with version number 1, and CG configuration 2 is associated with version number 2. Moreover, when the type of reserved CG-SDT resource status is hybrid 2003, then both cell-based reserved CG-SDT resource status and CG-SDT configuration based reserved CG-SDT resource status are adopted and combined. For the hybrid type of reserved CG-SDT resource status 2003, a reserve objective which is a cell may support multiple CG-SDT configurations, and each CG-SDT configuration is associated with a version number. In the example of FIG. 20, Cell B supports CG-SDT configuration 1 which is associated with version number 2 and CG-SDT configuration 3 which is associated with version number 1, and Cell A supports CG-SDT configuration 2 which is associated with version 3.

Figure 21:
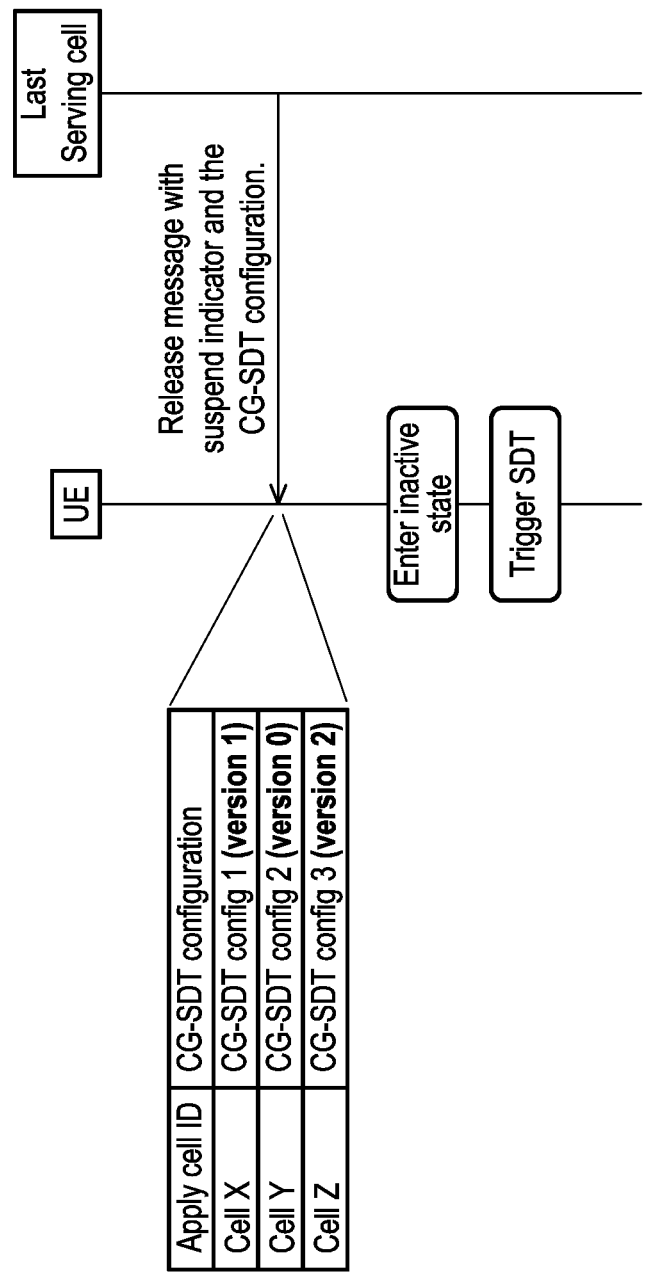
FIG. 21 illustrates providing a version number in the reserved CG-SDT resource status for supporting CG-SDT configuration update according a second exemplary embodiment of the disclosure.

Next, similar to FIG. 10, a last serving cell (e.g. 612 or cell A) may transmit to the UE (e.g. 611) a release message which may include not limited to a suspend indicator, an inactive state configuration, a SDT configuration, and a CG-SDT configuration as shown in FIG. 21. However, for the second exemplary embodiment, the CG-SDT configuration may further include a version number. In response to receiving the release message, the UE may enter an inactive state. After being in an inactive state, a SDT could be triggered. The suspend indicator is used to inform the UE to enter into an inactive state. The inactive state configuration may include not limited to a I-radio network temporary identifier (I-RNTI), radio network access (RAN) networking area (RNA) configuration, and security related information. The SDT configurations may include information related to the SDT parameters such as SDT trigger conditions, applied DRB information, and etc. The CG-SDT configuration may include entries which describes which CG-SDT configuration is to be applied for each cell ID, and each CG-SDT configuration could be associated with a different version number.

In the example of FIG. 21, CG-SDT configuration 1 is to be applied to Cell X, CG-SDT configuration 2 is to be applied to Cell Y, and CG-SDT configuration 3 is to be applied to Cell Z. Moreover, each CG-SDT configuration could be associated with a latest CG-SDT configuration version number. As in the example of FIG. 21, CG-SDT configuration 1 is associated with version 1, CG-SDT configuration 2 is associated with version 0, and CG-SDT configuration 3 is associated with version 2. Each different CG-SDT resource configuration may at least include a CG-SDT configuration ID, a CG-SDT resource location, a CG_Timer, a CG resource size, a periodicity, and some L1 parameters such as demodulation reference signal (DMRS) and CG-RNTI used to transmit SDT. The DMRS and CG-RNTI could be used by the UE to transmit an uplink (UL) data at the reserved CG resource. UE may also use the configured DMRS to transmit SDT and may use CG-RNTI to scramble the SDT data.

The procedures of the UE in an active state triggering a CG-SDT is shown in FIG. 22~FIG. 27 where the UE is assumed to acquire the CG-SDT resource configuration before entering inactive state, and also the handling of the CG-SDT resource being invalid is described. FIG. 22 shows a procedure of a UE triggering a CG-SDT with supporting CG-SDT resource update as a part of step S605 based on the second exemplary embodiment of the disclosure. Referring to FIG. 22, in step S2201, the UE in an inactive state would receive a latest reserved CG-SDT resource status which would update the CG-SDT configuration. In step S2202, the UE would determine whether the currently stored CG-SDT configuration is still valid in response to received the reserved CG-SDT resource status. In step S2203, the UE has determined that the currently stored CG-SDT configuration is valid, and FIG. 23 and its corresponding written description will further describe the implication of step S2203. Assuming that the stored CG-SDT configuration is no longer deemed valid, in step S2204, the UE would determine whether the stored CG-SDT configuration is invalid due to the version information. If yes, then the procedure proceed from either step S2206 or alternatively step S2207 which is to discard the stored CG-SDT configuration. If no, then the UE would discard the stored CG-SDT configuration.

Assuming that the procedure proceeds from step S2206, the UE would acquire the latest CG-SDT configuration after having determined that the current version information is outdated or invalid. The step S2206 has two alternatives with the first alternative S2208 involving the UE acquiring the latest CG-SDT configuration right after discovering that the CG-SDT configuration is invalid or alternatively the second alternative S2209 involving the UE acquiring the latest CG-SDT configuration when the UE triggers the SDT. For the second alternative S2209, the UE may acquire the latest CG-SDT configuration when the UE triggers SDT by using a resume procedure to request the latest CG configuration (S2210) or by using a RACH-based SDT to request the latest CG-configuration to transmit UL data (S2211).

Figure 23:
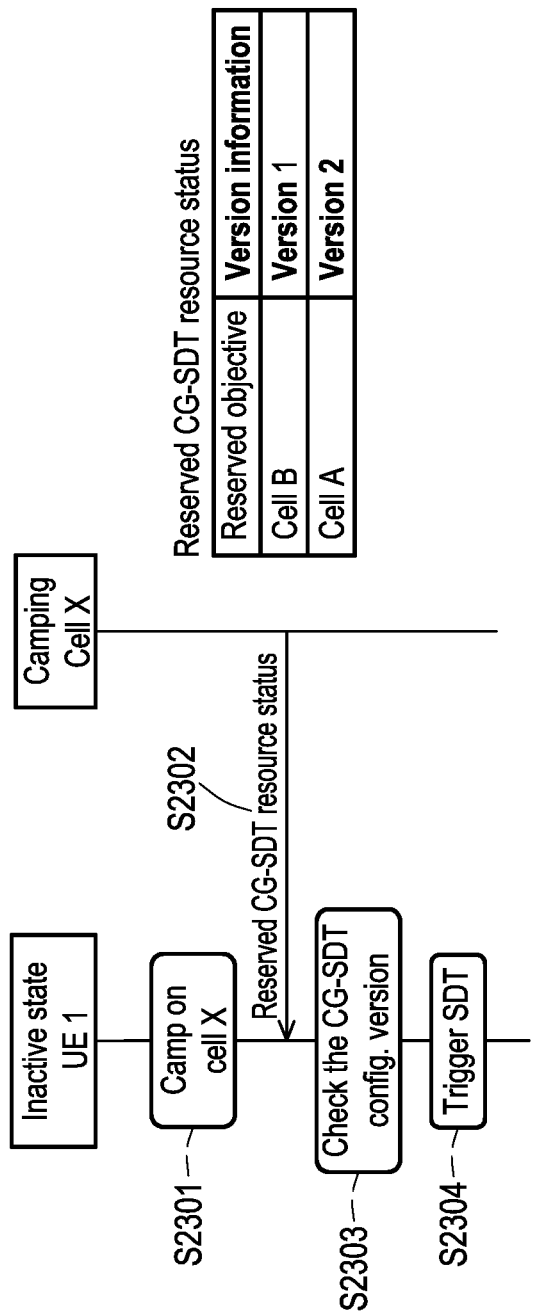
FIG. 23 illustrates an example of a UE triggering a CG-SDT with supporting CG-SDT resource update when the CG-SDT configuration is valid according a second exemplary embodiment of the disclosure.

The procedure of a UE triggering a CG-SDT with supporting CG-SDT resource update is shown in FIG. 23. For the example of FIG. 23, the CG-SDT configuration is assumed to be valid. To describe FIG. 23 in further details, in step S2301, the UE in an inactive state has camped on Cell X. In step S2302, the UE would receive a reserved CG-SDT resource status from Cell X. In the example of FIG. 23, the reserved CG-SDT resource status is assumed to be a cell-based CG-SDT resource status, but the reserved CG-SDT resource status may also be other types such as CG-SDT configuration based or hybrid. Also, according to the reserved CG-SDT resource status in this example, Cell A has CG-SDT configuration version 2 while Cell B has CG-SDT configuration version 1. This means that assuming that Cell A is the last serving cell for the UE prior to Cell X, the version of the stored CG-SDT configuration has to be version 2. In step S2303, the UE would check its stored CG-SDT configuration version. Assuming that the stored CG-SDT configuration version matches the version information that is required according to the reserved CG-SDT resource status, then the stored CG-SDT resource status would be considered valid. Therefore, if the stored CG-SDT configuration version of the UE is version 2, then the stored CG-SDT configuration version is valid. In step S2304, the UE could trigger a SDT by using the CG-SDT resource of Cell X.

Figure 24:
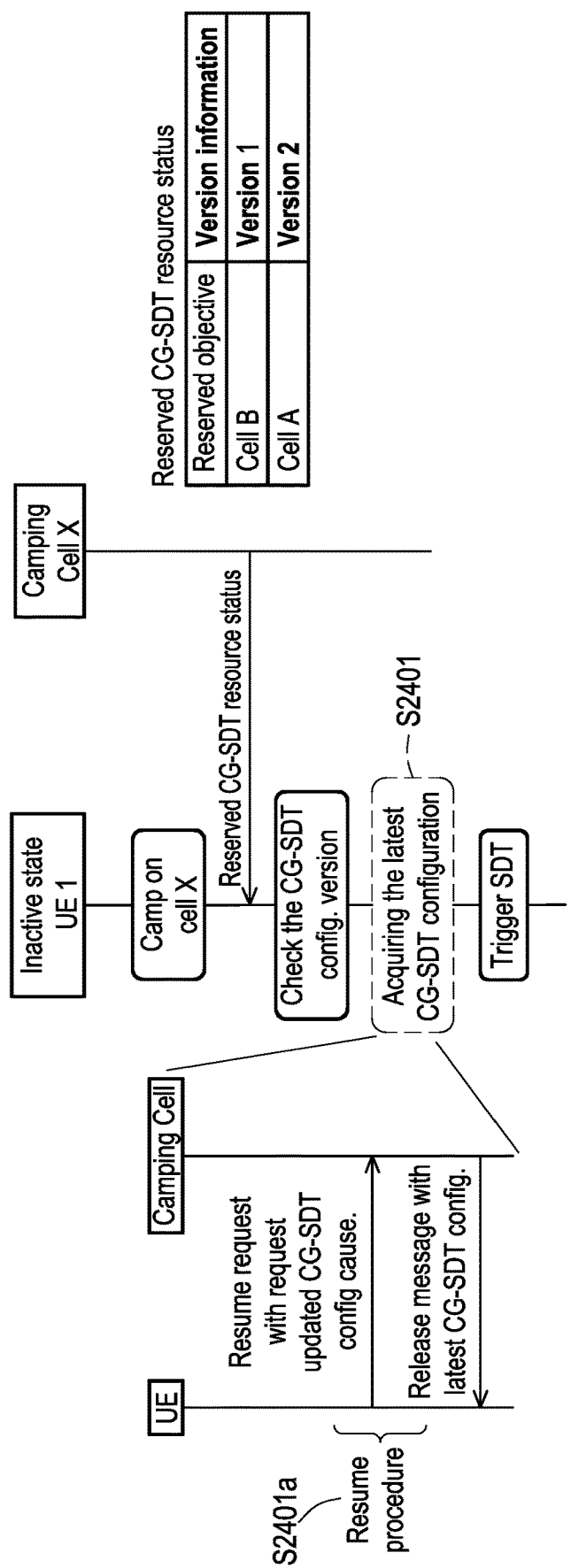
FIG. 24 illustrates an example of a UE triggering a CG-SDT with supporting CG-SDT resource update when the CG-SDT configuration is invalid according to the version information.

A procedure for handling invalid CG-SDT configuration is shown in FIG. 24. The steps of FIG. 24 is similar to FIG. 23 except that after checking the CG-SDT configuration version (S2303), the UE has found out that the stored CG-SDT configuration version is invalid as required by the reserved CG-SDT resource status since the stored Cell X CG-SDT configuration version is version 1 which is not the latest version. In step S2401, the UE would respond to the invalid CG-SDT configuration by acquiring the latest CG-SDT configuration right after discovering the CG configuration is invalid due to the version information (i.e. S2208). The UE may do so by using a resume procedure to request the latest CG-SDT configuration (i.e. S2210). During the resume procedure (S2401a), the UE would transmit to the camping cell, Cell X, a resume request message which includes a request for updated CG-SDT configuration. The UE would subsequently receive from Cell X a release message containing the latest CG-SDT configuration. Upon receiving the latest CG-SDT configuration, the UE may trigger a SDT by using the latest CG-SDT configuration.

Figure 25:
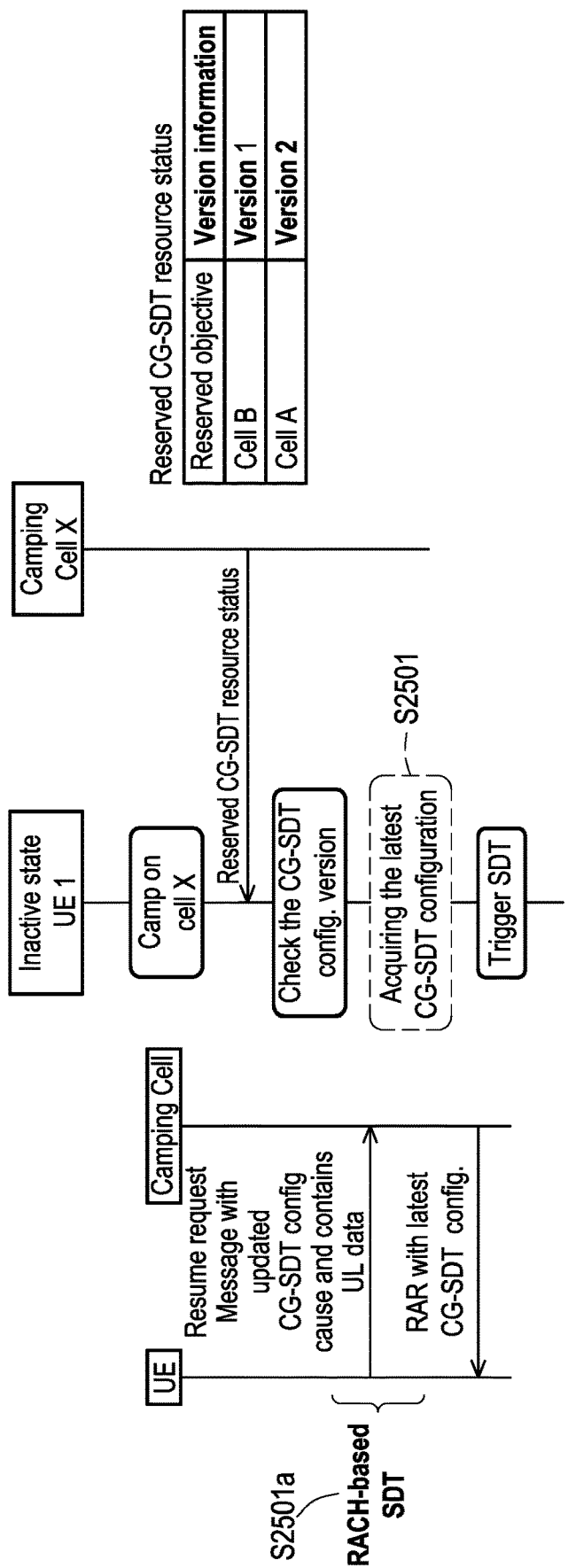
FIG. 25 illustrates alternatives of the example of FIG. 24 according a second exemplary embodiment of the disclosure.

FIG. 25 shows an alternative of the example of FIG. 24. In FIG. 25, the steps are the same as FIG. 24 except for S2501 which involves acquiring the latest CG-SDT configuration by using a RACH-based SDT procedure (S2501a) instead of a resume procedure (S2401a) when the UE needs to transmit UL data by SDT procedure. For the RACH-based SDT procedure (S2051a), the UE would transmit to the camping cell which is Cell X a resume request message containing a request for an updated CG-SDT configuration as well as an UL data. In response to transmitting the resume request message, the UE would receive from Cell X a RA response (RAR) message which contains the latest CG-SDT configuration. Upon receiving the latest CG-SDT configuration, the UE may trigger a SDT by using the latest CG-SDT configuration.

Figure 26:
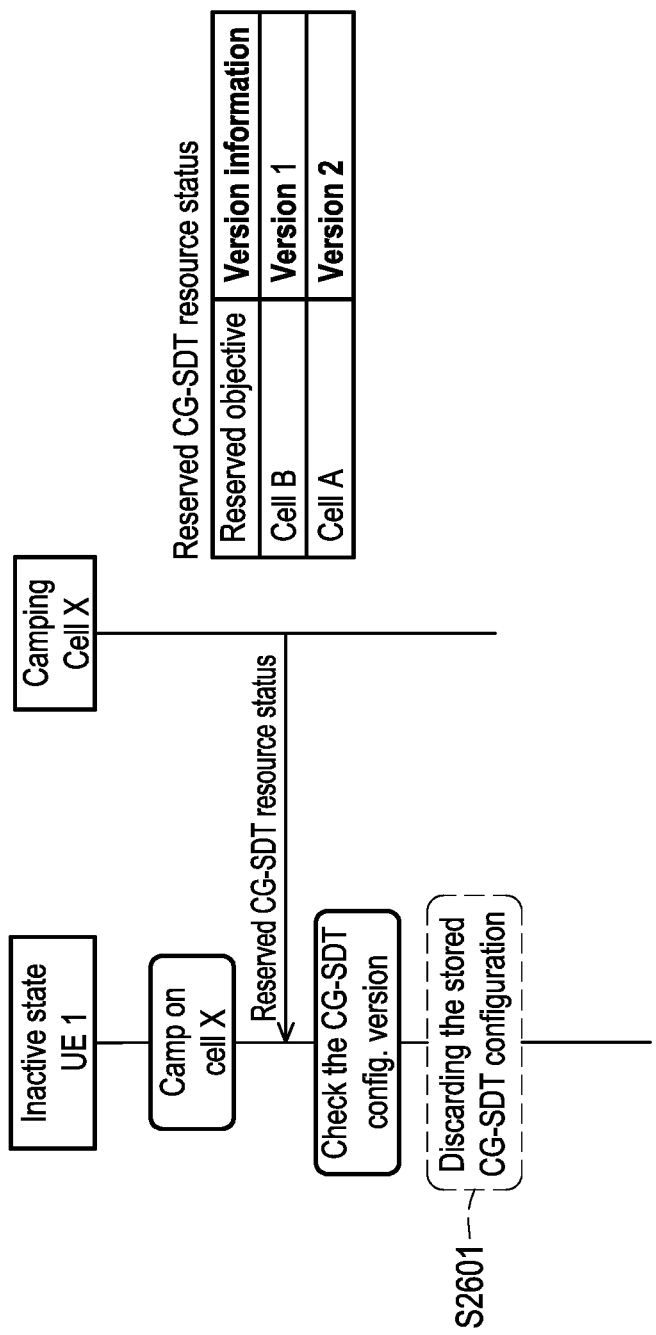
FIG. 26 illustrates an example of treating an invalid CG-SDT configuration by discarding the stored CG-SDT configuration according a second exemplary embodiment of the disclosure.

FIG. 26 shows another alternative of the example of FIG. 24 and FIG. 25. In FIG. 26, the steps are the same as FIG. 24 or FIG. 25 except that upon determining that the CG-SDT configuration version is invalid, in step S2601, the UE would discard the stored CG-SDT configuration. However, even if the CG-SDT configuration stored in the UE is discarded, the UE may still use a RACH-based procedure for a SDT, assuming that a RACH-based procedure has been enabled at the camping cell X.

Alternative to FIG. 26, another scenario for the CG-SDT configuration to be invalid is due to the stored CG-SDT configuration in UE not existing in the reserved CG-SDT resource status. Such scenario may occur if the last serving cell of UE is assumed to be cell C, and the version of the store cell X CG-SDT configuration of the UE is assumed to be version 1. Under such scenario, after the UE has checked the reserved CG-SDT resource status, the UE would consider that the currently stored CG-SDT configuration of cell X is invalid since the UE's last serving cell is Cell C which does not exist in the reserved CG-SDT resource status. When the CG-SDT configuration is invalid due the CG-SDT configuration not existing in the reserved CG-SDT resource status, the UE may discard the stored CG-SDT configuration which corresponds to Cell X. Subsequently, the UE may use a RACH-based procedure for a SDT, assuming that a RACH-based procedure has been enabled at the camping cell X.

For examples in FIG. 19~26, the UE may obtain the CG-SDT resource configuration right before entering into an inactive state, and the UE would subsequently store the CG-SDT resource configuration during inactive state. In these examples, the cell which reserves the CG resource may need to broadcast the reserved CG-SDT resource status in a system information broadcast message. Therefore, the timing of updating the reserved CG-SDT resource may be restricted by the modification period of the system information broadcast message. Also, UE would need to a perform a verification process to verify the validity of stored CG-SDT configuration after camping a cell. If the UE does not trigger a CG-SDT, the verification process is superfluous and leads to wastes. However, alternative to the examples in FIG. 19~26, the UE may instead acquire the CG-SDT resource configuration for the camping cell when triggering the UE triggers a CG-SDT (i.e. S2209). Thus, the camping cell could dynamically update the reserved the CG-SDT resource, and the UE would only need to acquire the CG-SDT resource configuration from the camping cell when the UE needs to trigger a CG-SDT. FIG. 27~FIG. 32 provides related examples where the UE acquires a CG-SDT resource configuration from the camping cell when the UE triggers a CG-SDT.

FIG. 27 shows an example of a negotiating a CG-SDT resource between Cell A and Cell X by using CG-Cofigschedule to describe how the camping cell will provide CG-SDT resource configuration. Referring to FIG. 27, in step S2701, Cell A would transmit a CG-SDT request message to Cell X, and Cell X would respond by transmitting a CG-SDT response message which includes the parameter CG-Cofigschedule. In this example, Cell X which reserves the CG-SDT resource would provide the CG-SDT resource configuration by itself, and thus Cell X does not need to provide the CG-SDT resource configuration during the negotiation of the CG-SDT resource. Instead, Cell X would provide CG-CofigSchedule within the CG-SDT response message. The CG-CofigSchedule is the information of how cell X will schedule the CG-SDT resource configuration. For example, the CG-CofigSchedule may at least include the search space of the CG configuration and the CG_config-RNTI (CGC-RNTI) for receiving the CG configuration and/or scheduling the transmission of the CG configuration.

The CG-CofigSchedule for different CG-SDT configurations could be the same or be different. For example, Cell X may reserve CG-SDT resource 1 to Cell A and may reserve CG-SDT resource 2 to Cell B. The CG-CofigSchedule for the CG-SDT configuration associated with CG-SDT resource 1 and the CG-CofigSchedule for the CG-SDT configuration associated with CG-SDT resource 2 could be different. However, if Cell X may reserve both CG-SDT resource 1 and CG-SDT resource 2 to cell A, then the CG-CofigSchedule for the CG-SDT configuration associated with CG resource 1 and the CG-CofigSchedule for the CG-SDT configuration associated with CG-SDT resource 2 could be the same.

Figure 28:
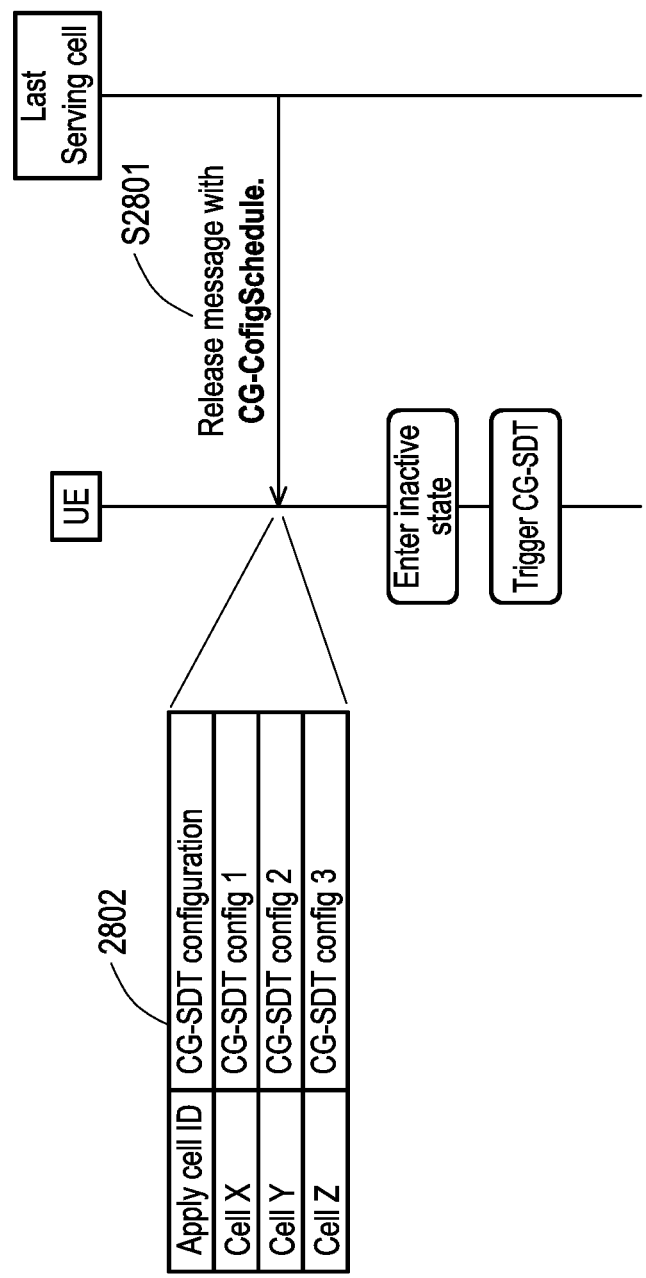
FIG. 28 illustrates an example of using a release message to transmit a CG-SDT configuration which includes CG-Cofigschedule according an exemplary embodiment of the disclosure.

After a UE migrates to another cell, a release message would be transmitted from a last serving cell to the UE. An example of using a release message to transmit a CG-SDT configuration which includes CG-Cofigschedule is shown in FIG. 28. In step S2801, the last serving cell would transmit to the UE a release message which includes CG-CofigSchedule. In response to receiving the release message, the UE may enter into an inactive state and subsequently the UE may trigger a CG-SDT. The release message may include a suspend indicator, an inactive state configuration, SDT configurations, and CG-SDT configuration. The suspend indicator is used to inform UE to enter into an inactive state. The inactive state configuration may include I-RNTI, RNA configuration, and security related information. The SDT configurations include information related to the SDT parameters such as SDT trigger conditions, applied DRB information, and etc. The CG-SDT configuration may at least include the CG-CofigSchedule and also a table 2802 which describes which CG-SDT configuration is to be applied for a particular cell. For example, the table 2802 shows that CG-SDT configuration 3 is to be applied when the UE camps on Cell Z.

Figure 29:
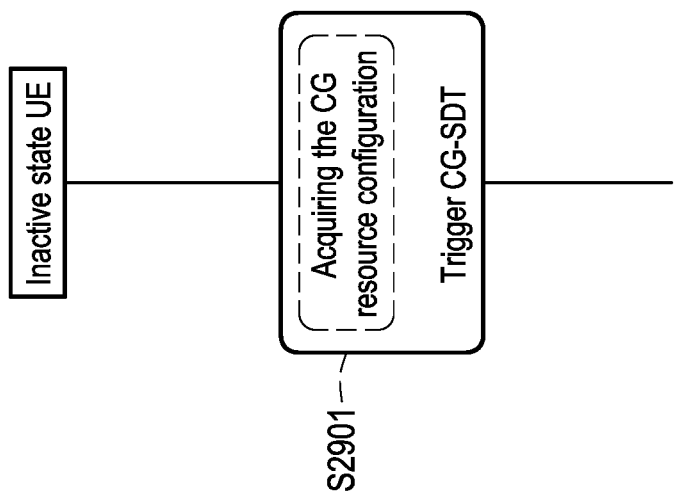
FIG. 29 illustrates a UE verifying whether the CG-SDT configuration is valid according to CG-Cofigschedule when the UE triggers a CG-SDT according an exemplary embodiment of the disclosure.

The example of FIG. 29 shows a UE in an inactive state camping on Cell X. In step S2901, before the UE triggers a CG-SDT, and the UE may acquire the CG-SDT resource configuration. However, in this example, Cell X may not provide to the reserved CG-SDT resource status. Thus, before the UE triggers the CG-SDT, the UE would verify whether the CG-SDT configuration is valid according to the CG-Cofigschedule before the UE triggers a CG-SDT. If the CG-SDT configuration is valid according to the CG-Cofigschedule before the UE triggers a CG-SDT, then the UE would use the configured CG-SDT resource for the CG-SDT. If the CG-SDT configuration is invalid according to the CG-Cofigschedule before the UE triggers a CG-SDT, then the UE cannot acquire the CG-SDT resource configuration by the corresponding CG-CofigSchedule. Consequently, a failure may occur due to the CG-SDT resource configuration not existing in the camping cell. The UE may then instead use a RACH-based procedure for the SDT, assuming that a RACH-based procedure has been enabled at the camping cell. Otherwise, the UE would consider the SDT to be invalid in the camping Cell X.

Figure 30:
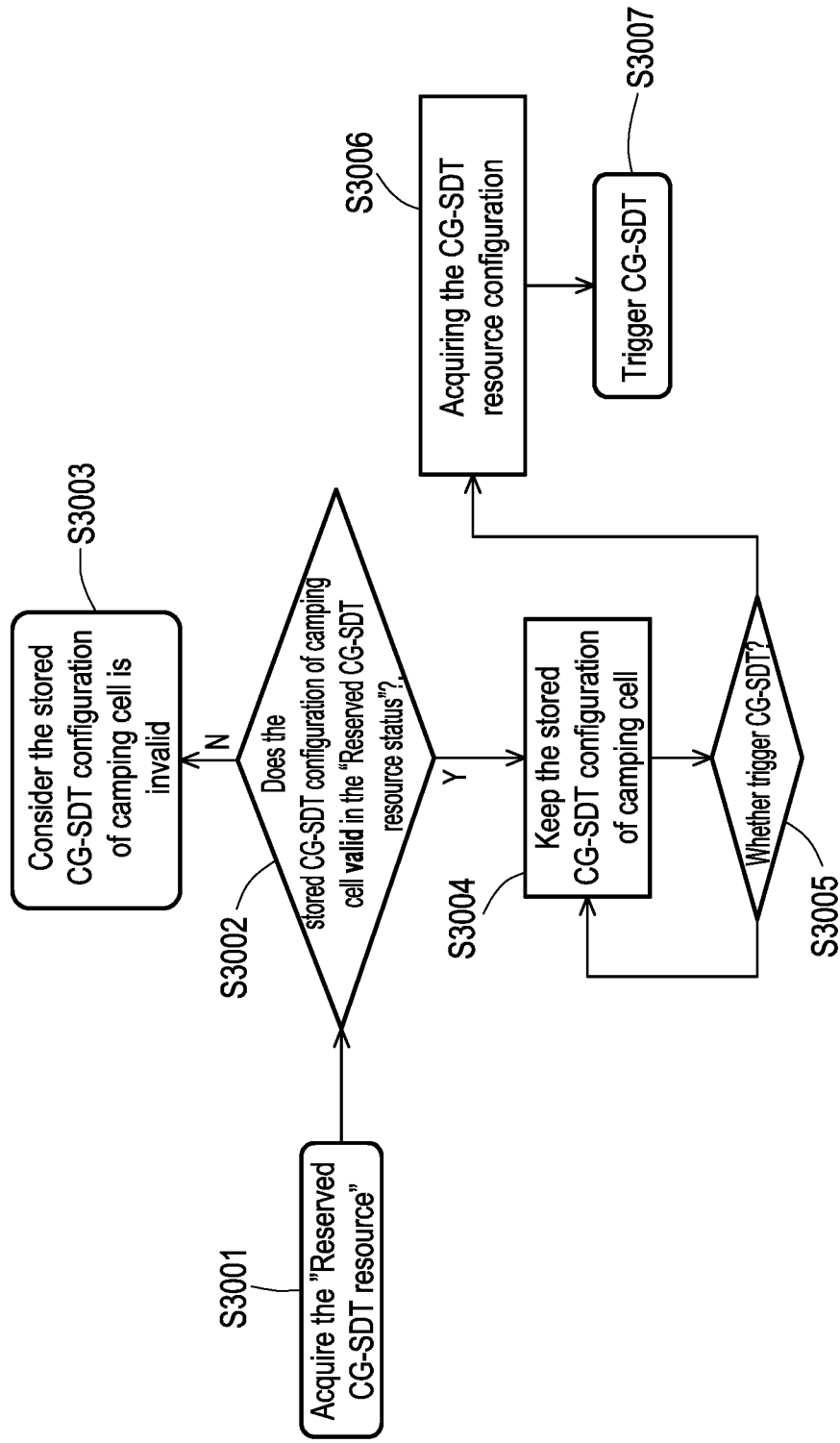
FIG. 30 illustrates a procedure of a UE triggering CG-SDT in response to receiving a reserved CG-SDT resource according an exemplary embodiment of the disclosure.

FIG. 30 shows an example of a CG-SDT triggering procedure. In this example, a UE in an inactive state is assumed to have a pre-existing stored CG-SDT configuration and is assumed to camp on cell X which is within a list of the stored CG-SDT configuration. But in this example, Cell X may provide the reserved CG-SDT resource status which indicates a valid CG configuration. The procedure of FIG. 30 is as follows. In step S3001, the UE would acquire and store a reserved CG-SDT resource from Cell X. In step S3002, the UE would determine whether the stored CG-SDT configuration of the camping cell is valid in the reserve CG-SDT resource status. If the stored CG-SDT configuration of the camping cell is invalid in the reserve CG-SDT resource status, then in step S3003, the UE would consider the stored CG-SDT configuration of camping cell as invalid. If the stored CG-SDT configuration of the camping cell is valid in the reserve CG-SDT resource status, then in step S3004, the UE would keep the stored CG-SDT configuration of camping cell. In step S3005, the UE would determine whether to trigger a CG-SDT. If not, then the process proceeds from step S3004. If yes, then in step S3006, the UE would acquire the CG-SDT resource configuration by CG-CofigSchedule information. In step S3007, the UE would trigger CG-SDT. The overall mechanism of this example is to provide reserved CG-SDT resource status by the camping cell, and thus from the reserved CG-SDT resource status, the UE may first know whether the stored CG-SDT configuration is valid or not. The advantage of this mechanism is that the UE may first decide whether to acquire the configuration. For example, if it is known that the stored CG-SDT configuration has expired, the UE has no need to spend time trying to obtain the configuration whenever the UE decides to trigger the SDT.

Figure 31:
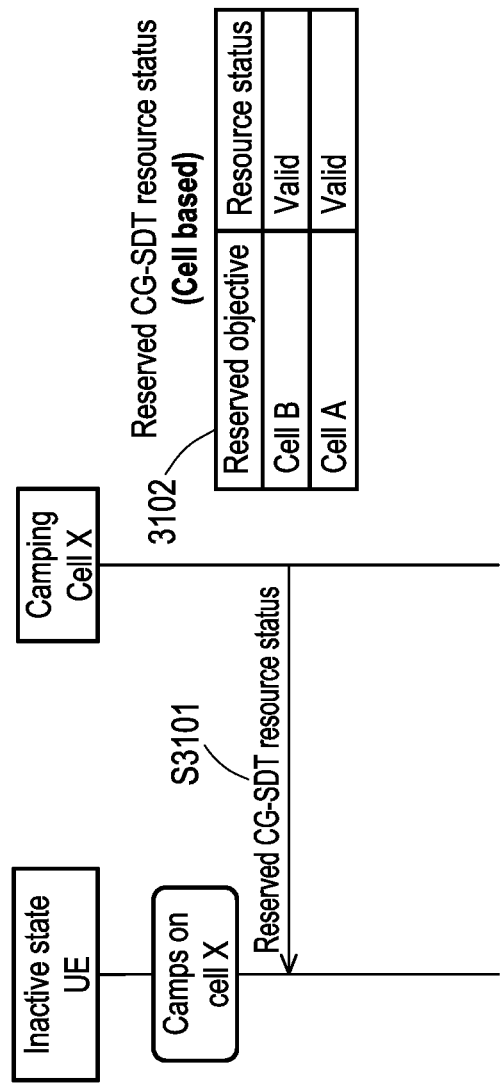
FIG. 31 illustrates a procedure of a UE determining whether to release the stored CG-SDT configuration of camping cell based on the validity of CG-SDT configuration according an exemplary embodiment of the disclosure.

FIG. 31 shows an example of a UE having release the stored CG-SDT configuration of camping cell in response to a valid CG-SDT configuration and does not subsequently trigger a CG-SDT. A UE in an inactive state is assumed to have a stored CG-SDT configuration, and the UE camps on Cell X which is within a list of cells in the stored CG-SDT configuration. In step S3101, Cell X provides a reserved CG-SDT resource status which indicates the CG configuration being valid for Cell A and Cell B. In principle, if the CG-SDT resource status received from last serving cell or the last gNB is invalid, then the UE in the inactive state will release the corresponding CG-SDT configuration. The invalidity of the CG-SDT resource status may occur if the stored CG-SDT configuration is indicated as invalid accord to the reserved CG-SDT resource status. Moreover, if the Reserved CG-SDT resource status is cell based and the last serving cell of the UE does not exist in the reserved CG-SDT resource status, then the UE would consider the stored CG-SDT configuration of camping cell as being invalid. In the example of FIG. 31, since Cell X is not within the reserved CG-SDT resource status 3102, then the UE would consider the stored CG-SDT configuration of Cell X as being invalid and would subsequently release the stored CG-SDT configuration. The UE would then not to use the stored CG-SDT configuration of camping cell for the eventual SDT.

Figure 32:
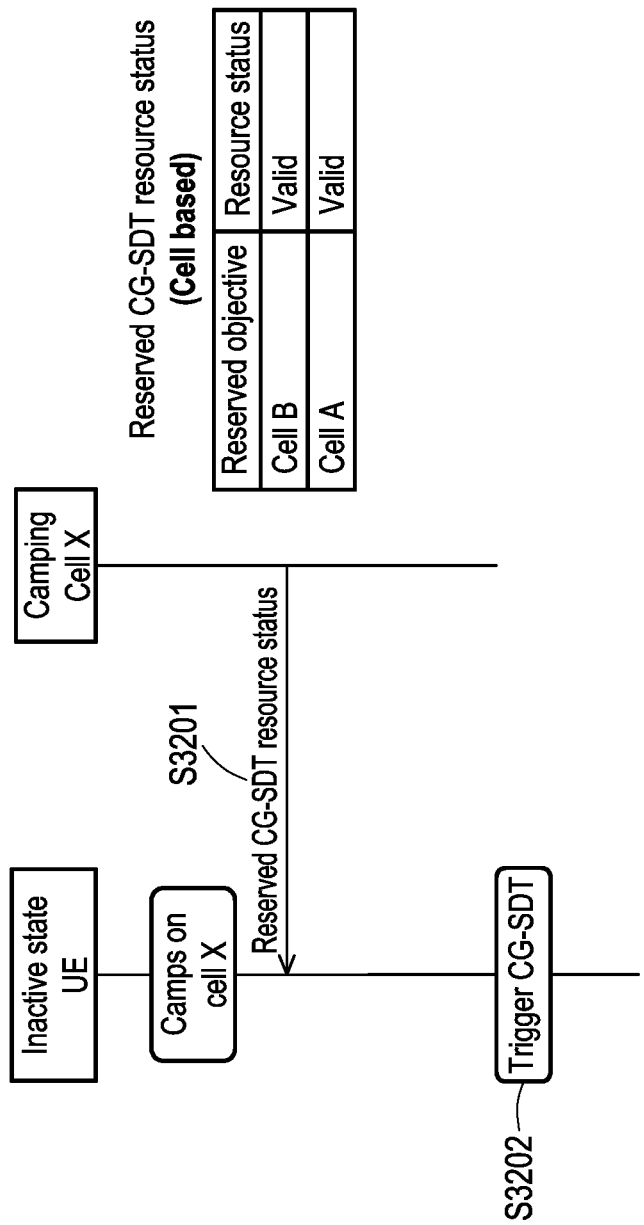
FIG. 32 illustrates a UE acquiring a CG resource configuration of the camping cell based on the CG-CofigSchedule within the store CG-SDT configuration according an exemplary embodiment of the disclosure.

FIG. 32 shows an example of a UE acquiring a CG resource configuration of the camping cell based on the CG-CofigSchedule within the stored CG-SDT configuration and subsequently perform a CG-SDT by using the reserved CG-resource. In this example, the UE in an inactive state having a stored CG-SDT configuration camps on Cell X which is within the stored CG-SDT configuration. Cell X may provide the reserved CG-SDT resource status which indicates the valid CG configurations for Cell A and Cell B. Referring to FIG. 32, in step S3201, Cell X transmits its reserved CG-SDT resource status to the UE which is in an active state and camps on Cell X. Next, the UE determines whether the stored CG-SDT configuration of the camping cell is valid in the reserved CG-SDT resource status. From the reserved CG-SDT resource status, the UE may acquire resource status within the reserved CG-SDT resource status, and the resource status may indicate that the stored CG-SDT configuration of the camping cell is valid or invalid. If the resource status indicates that the stored CG-SDT configuration of the camping cell is valid, then the UE in step S3202 may acquire the CG resource configuration of the camping cell based on the CG-CofigSchedule within the store CG-SDT configuration. If the resource status indicates that the stored CG-SDT configuration of the camping cell is invalid, then the UE in step S3202 may trigger a SDT by using other means such as by using a RACH-based procedure or a resume procedure.

In view of the aforementioned descriptions, the present disclosure is suitable for being used in a wireless communication system and is able to configure CG-SDT resources in a way that allows a UE in an inactive state to more efficiently transmit small data as the UE migrates among different cells.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method used by a UE to preconfigure a resource for small data transmission in an inactive state, the method comprising:
    preconfiguring, by the UE, a configured grant (CG) resource for small data transmission (SDT) in an inactive state at least by:
        receiving a configured grant (CG) configuration which is for a small data transmission before entering the inactive state and store the CG grant configuration which comprises a list of CG resource configurations associated with a list of cells as a stored CG grant configuration;
    entering into the inactive state;
    verifying the CG resource of a camping cell associated with the CG configuration by determining whether the camping cell satisfies a validation condition before triggering the small data transmission (SDT), wherein the validation condition comprises whether the camping cell is within the list of cells of the CG configuration of the stored CG grant configuration;
    utilizing the CG resource for the SDT when the validation condition has been determined as being satisfied.

2. The method of claim 1, wherein each CG resource configuration of the list of CG configurations comprises a CG resource set to be used for a SDT.

3. The method of claim 1, wherein each CG resource configuration within the list of CG configurations comprises a CG-CofigSchedule information used for scheduling a CG resource.

4. The method of claim 3, wherein each CG resource configuration of the list of CG resource configurations is associated with the CG-CofigSchedule from which the CG resource is acquired-.

5. The method of claim 4 further comprising:
    verifying whether the CG resource is valid according to the CG-CofigSchedule;
    performing the SDT by using the CG resource if the CG resource is valid according to the CG-CofigSchedule; and
    performing the SDT by using a RACH based procedure if the CG resource is invalid according to the CG-CofigSchedule.

6. The method of claim 5, wherein in response to the CG resource being valid as the verification condition is satisfied, a CG resource configuration is acquired before performing the SDT.

7. The method of claim 6, wherein the CG resource configuration is acquired from the CG-CofigSchedule before performing the SDT in response to the CG resource being valid.

8. The method of claim 1, wherein the validation condition further comprises whether the CG resource of the camping cell is valid.

9. The method of claim 8, wherein the whether the CG resource of the camping cell is valid is determined according to a reserved CG resource status for a SDT (CG-SDT) which is received from the camping cell.

10. The method of claim 9, wherein verifying the CG resource of the camping cell associated with the CG configuration by determining whether the camping cell satisfies the validation condition comprising:
    determining whether a last serving cell belongs to the reserved CG-SDT and whether a resource status of the last serving cell is indicated as being valid according to the reserved CG-SDT; and
    the validation condition has been determined as being satisfied when the last serving cell belongs to the reserved CG-SDT and the resource status of the last serving cell is indicated as being valid according to the reserved CG-SDT.

11. The method of claim 9, wherein verifying the CG resource of the camping cell associated with the CG configuration by determining whether the camping cell satisfies the validation condition comprising:
    determining whether a CG-SDT configuration number of the camping cell is valid according to the reserved CG-SDT; and
    the validation condition has been determined as being satisfied when the CG-SDT configuration number of the camping cell has been determined as valid according to the reserved CG-SDT.

12. The method of claim 1, wherein utilizing the CG resource for the SDT comprising:
    performing the SDT by transmitting a uplink (UL) data to the camping cell by using the CG resource; and
    receiving a response message from the camping cell in response to transmitting the UL data.

13. The method of claim 12 further comprising:
    determining whether SDT is successful by using a timer; and
    the SDT is successful if the response message is received before the timer expires; and the SDT has failed if the response message is not received before the timer expires or is received after the timer has expired.

14. The method of claim 13 further comprising:
using a random-access channel (RACH) based procedure to re-transmit the UL data in response to the SDT having failed.

15. The method of claim 13 further comprising:
using a signaling within a resume procedure to re-transmit the UL data in response to the SDT having failed.

16. The method of claim 13 further comprising:
using another CG resource after randomly skipping some CG resources to re-transmit the UL data in response to the SDT having failed.

17. The method of claim 1, wherein each CG resource configuration of the list of CG resource configurations associated with the list of cells is further associated with a version number.

18. The method of claim 17, wherein the validation condition further comprises whether the CG configuration of the camping cell is valid according to the version number.

19. The method of claim 18 further comprising:
re-acquiring the CG configuration from the camping cell right after the CG configuration of the camping cell is determined to be invalid.

20. The method of claim 18 further comprising:
re-acquiring the CG configuration from the camping cell right before performing the SDT.

21. The method of claim 18 further comprising:
discarding the CG configuration is the CG resource of the camping cell is invalid due to the version number being incorrect.

22. A UE comprising:
a storage medium;
a transceiver which operates in millimeter wave (mm Wave);
a processor coupled to the transceiver and the storage medium and configured at least to:
preconfigure, by the processor, a configured grant (CG) resource for small data transmission (SDT) in an inactive state at least by:
receiving a configured grant (CG) configuration which is for a small data transmission before entering an inactive state and store in the storage medium the CG grant configuration which comprises a list of CG resource configurations associated with a list of cells as a stored CG grant configuration;
enter into the inactive state;
verify a CG resource of a camping cell associated with the CG configuration by determining whether the camping cell satisfies a validation condition before triggering a small data transmission (SDT) procedure, wherein the validation condition comprises whether the camping cell is within the list of cells of the CG configuration of the stored CG grant configuration; and
utilize the CG resource for the SDT procedure when the validation condition has been determined as being satisfied.

* * * * *